United States Patent [19]

Schuring et al.

[11] Patent Number: 5,560,737
[45] Date of Patent: Oct. 1, 1996

[54] PNEUMATIC FRACTURING AND MULTICOMPONENT INJECTION ENHANCEMENT OF IN SITU BIOREMEDIATION

[75] Inventors: John R. Schuring, Blairstown; David S. Kosson, Neshanic Station; Conan D. Fitzgerald, Maplewood; Sankar Venkatraman, Piscataway, all of N.J.

[73] Assignee: New Jersey Institute of Technology, Newark, N.J.

[21] Appl. No.: 515,463

[22] Filed: Aug. 15, 1995

[51] Int. Cl.$^6$ .............................. B09C 1/08; E21B 43/12; E21B 43/26
[52] U.S. Cl. .......................... 405/128; 166/53; 166/246; 166/308; 210/747; 405/258; 405/263
[58] Field of Search ................................ 405/128, 130, 405/258, 263; 166/53, 177.5, 246, 250.15, 308; 210/611, 747

[56] References Cited

U.S. PATENT DOCUMENTS

| | | | |
|---|---|---|---|
| 4,945,988 | 8/1990 | Payne et al. | 405/128 X |
| 5,032,042 | 7/1991 | Schuring et al. | 405/258 |
| 5,133,625 | 7/1992 | Albergo et al. | 405/263 |
| 5,178,491 | 1/1993 | Graves et al. | 405/128 |
| 5,180,013 | 1/1993 | Abdul | 166/53 X |
| 5,249,888 | 10/1993 | Braithwaite et al. | 405/128 |
| 5,277,518 | 1/1994 | Billing et al. | 166/246 X |

OTHER PUBLICATIONS

R. L. Valentine et al. (1986) "Biotransformation", Vadose Zone Modelling of Organic Pollutants, eds. Stephen Hern et al., Lewis Publishers, Inc. Michigan, Chapter 9.

R. Wetzel et al. (1985) "Demonstration of In Situ Biological Degradation of Contaminated Ground Water and Soils", Sixth National Conference on Management of Uncontrolled Hazardous Waste Sites, Washington, D. C.

V. Jhaveri et al. (1985) "Bioreclammation of Ground and Ground Water by In Situ Biodegradation" Case History, Sixth National Conference on Management of Uncontrolled Hazardous Waste Sites, Washington, D. C.

P. Yaniga et al. (1986) "Aquifer Restoration Via Accelerated In Situ Biodegradation of Organic Contaminants", Seventh National Conference on Management of Uncontrolled Hazardous Waste Sites, Washington, D. C.

Evans et al. (1991) "Anaerobic Degradation of Toluene by a Denitrifying Bacterium", Appl. Env. Microb. 57(4):1139–1145.

*Primary Examiner*—George A. Suchfield
*Attorney, Agent, or Firm*—Klauber & Jackson

[57] ABSTRACT

A method and apparatus are disclosed for reducing or eliminating non-naturally occurring, subsurface, liquid contaminants from one or more soil formations, which involves the steps of pneumatically fracturing the soil formation to produce a fracture network; simultaneously or subsequently inserting into said fracture network and throughout adjacent portions of the soil formation, a pressurized gas stream, and introducing into the pressurized gas stream a mixture of one or more liquid amendments, wherein said pressurized gas, in conjunction with said liquid amendments, has an oxygen or other electron acceptor content sufficient to promote the growth of aerobic or other microorganisms in said fracture network, and wherein the pressurized gas has a sufficiently high gas to liquid ratio to atomize the liquid amendments, whereby the amendments are distributed throughout the soil formation.

17 Claims, 6 Drawing Sheets

STEP B - PNEUMATICALLY INJECT BIOLOGICAL AMENDMENTS ON A PERIODIC BASIS

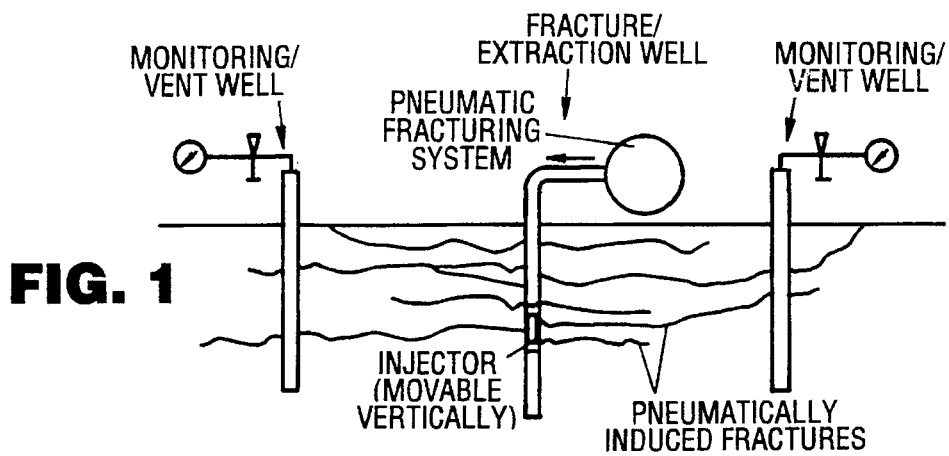
STEP A - PNEUMATICALLY FRACTURE THE FORMATION
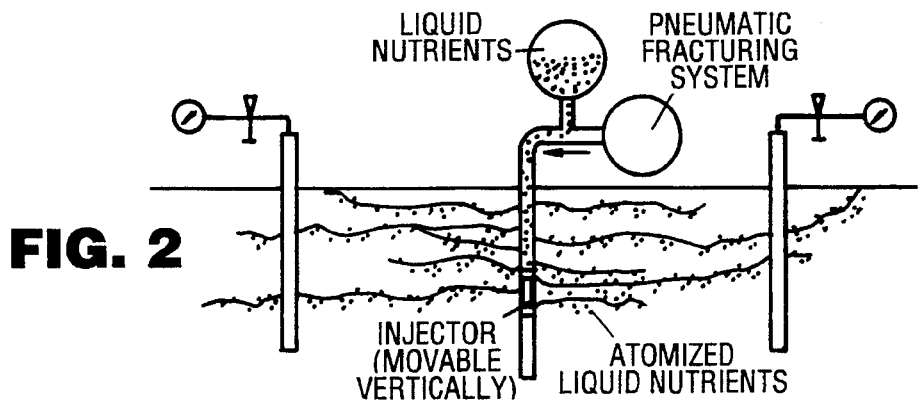
STEP B - PNEUMATICALLY INJECT BIOLOGICAL AMENDMENTS ON A PERIODIC BASIS
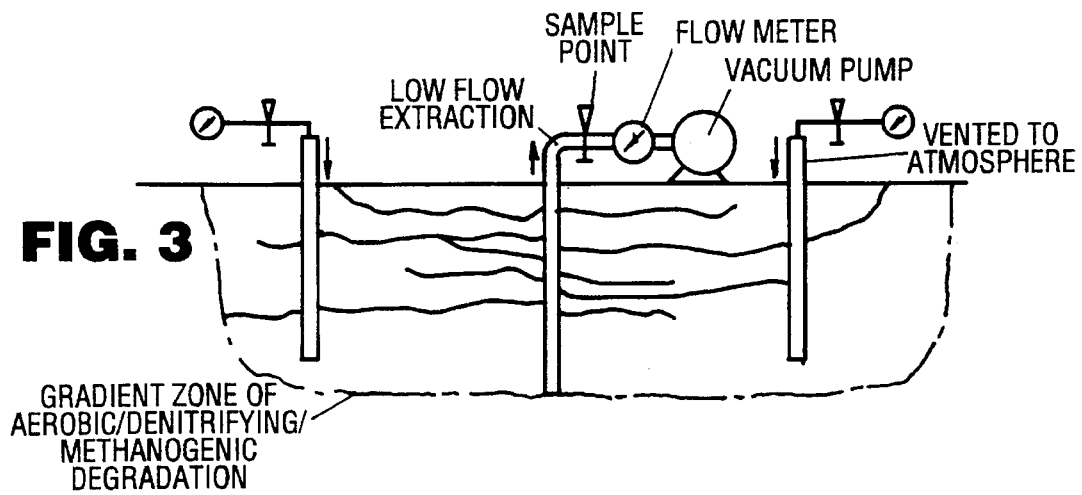
STEP C - OPERATE IN SITU BIODEGRADATION CELL

PNEUMATIC BIO-INJECTION SYSTEM

TYPICAL VENT WELL AND EXTRACTION WELL DESIGN

PNEUMATIC BIOINJECTION SYSTEM

FIG. 7

A BIOVENTING SYSTEM

PNEUMATIC FRACTURING AND MULTICOMPONENT INJECTION ENHANCEMENT OF IN SITU BIOREMEDIATION

FIELD OF THE INVENTION

The present invention is generally in the field of methods and apparatus for treating soil contaminated with organic compounds. Within that field, it relates particularly to methods and apparatus for treating the soil in situ without having to remove the soil from the site. The present invention especially relates to methods and apparatus for in situ subsurface soil remediation and analysis of contaminants from the soil by the use of a gas injected into the soil at one point, with removal of the contaminants at another point, the injection and removal usually being by means of wells. More especially, the present invention is concerned with methods and apparatus wherein such wells are utilized to promote biodegradation of contaminants, particularly by means of microbes. In such methods, microbes which are known or demonstrated to be useful in biodegrading the contaminant at the site, are isolated, cultured to increase their numbers, and then inoculated through the point of contamination or through an injection well.

BACKGROUND OF THE INVENTION

Despite significant progress in recent years in the prevention of dumping, and the removal of contaminating materials from the soil and ground water, it remains a major environmental problem in the United States and other industrialized nations. In many areas of the country, the magnitude of subsurface contamination poses a serious threat, both to the health of humans and wildlife near it, and to the environment as well. While governmental regulations have mandated the control and reduction of such subsurface contamination, the state of the technology available to clean-up contamination sites has often lagged far behind, and when such technology has proven effective it has also usually been prohibitively expensive.

Soil Zones Which Carry Contaminants

With regard to the subsurface soils which form the contamination sites with which the present invention is concerned, this ground water environment is generally divided into two major zones, (1) the unsaturated zone, also known as the "vadose zone" and (2) the saturated zone. However, perched water zones are also included, although the vadose zone is the most important. The vadose zone extends from the ground surface down to the ground water table, while the saturated zone begins at the ground water table and extends to a further depth. The vadose zone may be further divided into additional subzones, but will be treated as a single zone in the present discussion. Since the vadose zone is the uppermost layer of the terrestrial environment, it contains the most important pathways for the toxic and hazardous chemicals to enter groundwater systems. As such, the removal of the toxic and hazardous chemicals in this zone is of paramount importance for all groundwater remediation. The principal mechanisms that control the flow and transport of contaminating chemical compounds in the vadose soil zone are mass flow, liquid diffusion, and vapor diffusion. Transport of those contaminants from the unsaturated to the saturated zones occurs continuously by percolation and vapor transport, thus making treatment of the vadose zone essential to any successful ground water remediation.

In Situ Remediation—Vapor Extraction

Moreover, where methods have been developed in the past which utilize wells to extract ground water samples from beneath the surface and bring those samples above ground for remedial action, it has been the case that the equipment for effecting groundwater clean-up has been normally complex and often only marginally effective. Indeed, studies have shown that it is less costly to remove volatile organic compounds (VOCs) from the vadose zone than to pump and treat contaminated ground water. It is for that reason that technology is currently being developed for the in situ removal of VOCs from the vadose zone. Such treatment technologies include vapor extraction, biodegradation, soil washing and thermal treatment. Vapor extraction is a process for the in situ removal of VOCs by mechanically extracting soil gases from the vadose zone. Specifically, one or more vertically oriented perforated vent wells are installed in the contaminated zone in the ground, and air is forced to travel through the pore space in the soil, causing volatilization of the liquid and adsorbed volatile organic compounds. The extracted soil gases are then either vented to the atmosphere or into an emission control system, depending on the concentration. The two major embodiments of such vapor extraction processes which have been demonstrated successfully in field use are in situ air stripping and vacuum extraction.

In order to carry out in situ air stripping, a series of interconnected air injector vents are supplied with forced air by an above ground blower and manifold system that forces the air into the soil through the perforated vent wells. A separate blower and manifold system is used to apply negative pressure to air extraction vents to withdraw the soil gases. The injection and extraction vents are located alternately within the array of vent wells on the site. To achieve a degree of flow containment, extraction vents are placed on the perimeter of the area being treated. However, this approach functions best with highly permeable soils, e.g., loose, sandy soils and has proven to be much less effective in tightly packed soils and in soils with a high clay content. Vapor extraction processes involving vacuum extraction utilize a vacuum pump installed on the wells which induces a negative pressure gradient around the well to remove the VOCs along with the soil gases.

In Situ Remediation—Biodegradation

Biodegradation is another process which has been used effectively in the treatment of soils contaminated with organic compounds. In the biodegradation process, usually referred to as bioremediation, the ecological conditions in the soil are altered to enhance microbial catabolism or to cometabolise the organic contaminant, thus transforming it into a simpler, non-toxic product. In most applications, indigenous microorganisms are utilized, although seeding of the soil with exogenous microorganisms has also been used where naturally occurring microorganisms are unable to degrade the contaminants Microorganisms are either (1) aerobic, which grow only in the presence of oxygen, (2) anaerobic, which grow only in the absence of oxygen, and (3) facultative anaerobic, which can grow either in the absence or presence of oxygen. The biodegradation method which has been found most effective in treatment of the vadose soil zone has been the aerobic microbial process. With this process, oxygen and often nutrients are injected or infiltrated into the subsurface environment, using wells or a percolation process. For example, wells are drilled into the soil and nutrients for feeding the microbes are dropped down into the well, or microbes are seeded in the well. Thereafter, the microbes are blown outwardly by forced air or the like. A concise summary of the major factors which affect the rate of biodegradation in the vadose zone are described by R. L. Valentine et al. in "Biotransformation", *Vadose Zone Modelling of Organic Pollutants*, eds. Stephen Hern et al., Lewis Publishers, Inc. Michigan, Chapter 9 (1986), and include: pH, temperature, water content, carbon content, clay content, oxygen, nutrients, the nature of the microbial population, acclimation and concentration. While a number of investigators have reported successful application of in situ biodegradation, important limitations exist, such as unfavorable reaction kinetics, low substrate concentration and slow degradability of certain compounds.

A number of specific applications of bioremediation with different degrees of success have been reported in the literature. R. Wetzel et al. in "Demonstration of In Situ Biological Degradation of Contaminated Ground Water and Soils", *Sixth National Conference on Management of Uncontrolled Hazardous Waste Sites*, Washington, D.C. (1985) describe a demonstration at Kelly Air Force Base, Texas, treating contaminants comprising of hydrocarbons, aromatics and halogenated organics, but noting that a major limiting factor of the remediation was the low permeability of the fine-grained soil layers present at the site. V. Jhaveri et al. describe in "Bioreclammation of Ground and Ground Water by In Situ Biodegradation" "Case History", *Sixth National Conference on Management of Uncontrolled Hazardous Waste Sites*, Washington, D.C. (1985) report the bioreclammation of a New Jersey site contaminated with methylene chloride, n-butyl alcohol, acetone and dimethylaniline, where after three years of in situ aerobic biological treatment, the contaminant plume was reduced by 90%. P. Yaniga et al. in "Aquifer Restoration Via Accelerated In Situ Biodegradation of Organic Contaminants", *Seventh National Conference on Management of Uncontrolled Hazardous Waste Sites*, Washington, D.C. (1986), describe the reclamation of an aquifer contaminated with benzene, toluene, and xylene using biodegradation, and emphasize the importance of oxygenating the subsurface environment, reporting superior rates of biodegradation using hydrogen peroxide as an oxygen donor, compared to using the traditional technique of air sparging.

Known Methods and Apparatus for Carrying out In Situ Bioremediation

A method and apparatus for establishing, maintaining and enhancing microorganisms utilized to remediate groundwater or soils contamination through the injection of nutrients and gases, using a cylindrical head with radial apertures and a pointed lower end adapted to penetrate the soil, and through which a fluid can be delivered, is disclosed in Albergo et al. U.S. Pat. No. 5,133,625. The fluid, which may be a viable microorganism culture containing nutrients, or may be a gas which permits or enhances the growth of ambient microorganisms, is introduced into a subsurface location under pressure through the apertures in the cyclindrical head. The pressure is provided by a pump or other means, and is adjustable. However, nothing in the disclosure of Albergo et al. suggests the method and apparatus of the present invention and the dramatic results achieved thereby. In Billings et al. U.S. Pat. No. 5,277,518 it is suggested that an oxygen-containing gas can be used to provide microorganisms and nutrients to the subsurface, and that injection wells can be connected to an air compressor for this purpose. In Payne et al. U.S. Pat. No. 4,945,988, a sparging process and apparatus is modified by placing an oxygen separator along conduit lines leading to an aquifer downstream of an air pump, which permits the delivery of air which is substantially oxygen free to the aquifer, or is oxygen enriched to the vadose zone, thereby preventing growth of aerobic bacteria in the aquifer, while stimulating such growth in the vadose zone. However, there is no suggestion in either disclosure of pneumatic fracturing or of the other novel features of the present invention.

Known Method and Apparatus for Pneumatic Fracturing of Soil Formations

Paramount among the limitations of the existing and emerging treatment technologies applicable to the vadose zone is the permeability of the soil formation being treated. The efficiency of in situ treatment processes all decrease as the soil permeability decreases. For soils with low permeabilities the existing processes are largely ineffective. Low soil permeability may be caused by a number of factors, including high clay content, high soil density and high fluid viscosity. Therefore, the effectiveness of virtually all in situ treatment processes in the vadose zone can be enhanced by increasing the permeability of the soil formation. Indeed, an important advance in this area was made by Schuring et al. with the discovery that pneumatically fracturing the contaminated soil formation leads to a significant improvement in the results obtained with a variety of in situ decontamination methods. The details of that discovery and the method and apparatus which are used to implement it are disclosed in Schuring et al. U.S. Pat. No. 5,032,042, which is incorporated herein by reference it its entirety.

The method described by Schuring et al. for eliminating subsurface contaminants from soil includes the steps of a) pneumatically fracturing the soil, including the steps of i) inserting a tubular probe partially into a well in the soil such that at least one orifice of a nozzle fluidly connected with the tubular probe is positioned at a predetermined height; ii) providing a sealed area in the well on opposite sides of the orifice; and iii) supplying a pressurized gas to the tubular probe which travels through the orifice into the soil to produce a fractured soil formation; and b) transforming the contaminants into a different state to decontaminate the soil, after creation of the fractured soil formation. There is also described therein in general terms the use of such pneumatic fracturing to enhance microbial activity, particularly in terms of increasing oxygen concentration in the soil and thereby encouraging more rapid aerobic digestion of the soil contaminants, of reducing the water content of the soil to enhance biodegradation, and of providing nutrient seeding. However, there is no disclosure in Schuring et al. providing details of the apparatus and methods which might be used to achieve those objectives. The present invention by contrast, does provide such detailed disclosure, as well as a description of the guidelines for those methods and apparatus based on the mass transport and biological mechanisms by which the contaminants are degraded within the situs of the geologic formation. Indeed, using the apparatus and methods of the present invention it has been found that, surprisingly, a synergistic effect can be obtained with respect to the subsurface biodegradation processes, with a correspondingly increased rate of contaminant removal which is dramatic. In accordance with the present invention, it has been possible to extend bioremediation into low permeability geologic formations which are not treatable with current in situ remediation methods.

SUMMARY OF THE INVENTION

In accordance with the present invention, there is provided a method for reducing or eliminating non-naturally occurring, subsurface, liquid contaminants from one or more soil formations, which includes the steps of a) pneumatically fracturing the soil formation, including the steps of i) inserting a tubular probe partially into the soil formation such that at least one orifice of a nozzle fluidly connected with the tubular probe is positioned at a predetermined height; and ii) supplying a pressurized gas into the tubular probe such that the pressurized gas travels through the at least one orifice into the soil to produce a fracture network in said soil formation; and simultaneously with creation of said fracture network, or subsequently thereafter, b) inserting into said fracture network and thereby throughout adjacent portions of said soil formation, a pressurized gas stream comprising sufficient oxygen to promote the growth of aerobic microorganisms throughout said fracture network and adjacent portions of said soil formation; and c) as necessary, repeating steps a) and b) on a sequential basis in order to treat additional portions of said soil formation(s), and on a periodic basis in order to replenish said oxygen to said fracture network and additional portions of said soil formation(s).

The present invention provides a method for reducing or eliminating contaminants in soil formations as described above, wherein the pressurized gas is compressed air, which is inserted into the fracture network and throughout the soil formation, thereby maintaining and enhancing the growth of indigenous aerobic microorganisms which are able to degrade the contaminants in the soil formation. The present invention further provides such a method wherein the pressure, flowrate and oxygen content of the pressurized gas are controlled by an automated system, whereby the treatment of any given soil formation can be tailored to the specific requirements of said formation.

In accordance with the present invention, there is also provided a method for reducing or eliminating non-naturally occurring, subsurface, liquid contaminants from one or more soil formations, which includes the steps of a) pneumatically fracturing the soil formation, including the steps of i) inserting a tubular probe partially into the soil formation such that at least one orifice of a nozzle fluidly connected with the tubular probe is positioned at a predetermined height; and ii) supplying a pressurized gas into the tubular probe such that the pressurized gas travels through the at least one orifice into the soil to produce a fracture network in said soil formation; and simultaneously with creation of said fracture network, or subsequently thereafter, b) inserting into said fracture network and thereby throughout adjacent portions of said soil formation, a pressurized gas stream, and introducing into said pressurized gas stream a mixture of one or more liquid amendments, and optionally water, wherein said pressurized gas, in conjunction with said liquid amendments and optionally water, has an oxygen or other electron acceptor content sufficient to promote the growth of aerobic or other microorganisms in said fracture network, and wherein said pressurized gas has a sufficiently high gas to liquid ratio to atomize said liquid amendments, whereby said amendments and optionally water are distributed throughout said fracture network and adjacent portions of said soil formation; and c) as necessary, repeating steps a) and b) on a sequential basis in order to treat additional portions of the soil formation(s), and on a periodic basis in order to replenish said liquid amendments and oxygen or other electron acceptor to said fracture network and adjacent portions of said soil formation(s).

In accordance with the present invention there is further provided a method for reducing or eliminating contaminants in soil formations as described above, wherein the gas is compressed air, which at the high gas to liquid ratio provides substantial amounts of oxygen to the fracture network and adjacent soil formation; the liquid amendments are one or more members selected from the group consisting of nutrients for growth of aerobic bacterial buffering compounds, and inoculum comprising aerobic microorganisms which are able to degrade said contaminants; and the survivability of the microorganisms contained in the liquid amendments and water is protected and the growth rate thereof is enhanced. The present invention further provides such a method wherein the blend of liquid amendments and their component concentrations are controlled by an automated system, whereby the treatment of any given soil formation can be tailored to the specific requirements of said formation.

In accordance with the present invention, there is still further provided a method for reducing or eliminating non-naturally occurring, subsurface, liquid contaminants from one or more soil formations by establishing an in situ bioremediation cell therein to degrade said contaminants, which includes the steps of a) pneumatically fracturing the soil formation, including the steps of i) inserting a tubular probe partially into the soil formation such that at least one orifice of a nozzle fluidly connected with the tubular probe is positioned at a predetermined height; and ii) supplying a pressurized gas into the tubular probe such that the pressurized gas travels through the at least one orifice into the soil to produce a fracture network in said soil formation; and simultaneously with creation of said fracture network, or subsequently thereafter, b) inserting into said fracture network and thereby throughout adjacent portions of said soil formation, a pressurized gas stream, and introducing a mixture of one or more liquid amendments, and optionally water, into said pressurized gas stream, wherein said pressurized gas, in conjunction with said liquid amendments and optionally water, has an oxygen or other electron acceptor content sufficient to promote the growth of aerobic or other microorganisms in said fracture network, and wherein said pressurized gas has a sufficiently high gas to liquid ratio to atomize said liquid amendments and optionally water, whereby said amendments and optionally water are distributed throughout said fracture network and adjacent portions of said soil formation; c) as necessary, repeating steps a) and b) on a sequential basis in order to treat additional portions of the soil formation(s), and on a periodic basis in order to replenish said liquid amendments and oxygen or other electron acceptor to said fracture network and adjacent portions of said soil formation(s); and d) maintaining a low volume flow of a pressurized gas throughout said fracture network and adjacent portions of said soil formation(s) by means of reduced pressure exerted thereon, wherein said pressurized gas has an oxygen content sufficient to promote the growth of aerobic microorganisms, for a time sufficient to establish an in situ bioremediation cell in said soil formation(s) and degrade said contaminants therein.

The present invention provides a method for reducing or eliminating non-naturally occurring, subsurface, liquid contaminants from one or more soil formations by establishing an in situ bioremediation cell therein to degrade said contaminants as described above, wherein the pressurized gas is compressed air; wherein the reduced pressure exerted on said fracture network and adjacent portions of said soil formation(s) is created by one or more extraction wells having vacuum pumps attached thereto; and wherein one or more vent wells are created to supply additional amounts of air to said soil formation(s).

In accordance with the present invention, there is still further provided a method for synergistically reducing or eliminating the non-naturally occurring, subsurface, liquid contaminants from one or more soil formations having low initial permeability, which includes the steps of a) pneumatically fracturing the soil formation, including the steps of i) inserting a tubular probe partially into the soil such that at least one orifice of a nozzle fluidly connected with the tubular probe is positioned at a predetermined height; and ii) supplying a pressurized gas into the tubular probe such that the pressurized gas travels through the at least one orifice into the soil to produce a fracture network in said soil formation; and simultaneously with creation of said fracture network, or subsequently thereafter, b) inserting into said fracture network and thereby throughout adjacent portions of said soil formation, a pressurized gas stream, and introducing a mixture of one or more liquid amendments, selected from the group consisting of nutrients for growth of aerobic or other microorganisms, buffering compounds, and inoculum comprising aerobic or other microorganisms which are able to degrade said contaminants, and optionally water, into said pressurized gas stream, wherein said pressurized gas, in conjunction with said liquid amendments and optionally water, has an oxygen or other electron acceptor content sufficient to promote the growth of aerobic or other microorganisms in said fracture network and adjacent portions of said soil formation, and wherein said pressurized gas has a sufficiently high gas to liquid ratio to atomize said liquid amendments and optionally water, whereby said amendments are distributed throughout said fracture network and adjacent portions of said soil formation; c) as necessary, repeating steps a) and b) on a sequential basis in order to treat additional portions of the soil formation(s), and on a periodic basis in order to replenish said liquid amendments and oxygen or other electron acceptor to said fracture network and adjacent portions of said soil formation(s); and d) maintaining a low volume flow of a pressurized gas throughout said fracture network and adjacent portions of said soil formation(s) by means of reduced pressure exerted thereon, wherein said pressurized gas has an oxygen content sufficient to promote the growth of aerobic microorganisms, for a time sufficient to synergistically eliminate or reduce said contaminants from said soil formation(s).

The present invention provides a method for reducing or eliminating non-naturally occurring, subsurface, liquid contaminants from one or more soil formations having low initial permeability to degrade said contaminants as described above, wherein the pressurized gas is compressed air; wherein the reduced pressure exerted on said fracture network and adjacent portions of said soil formation(s) is created by one or more extraction wells having vacuum pumps attached thereto; and wherein one or more vent wells are created to supply additional amounts of air to said soil formation(s).

There is further provided in accordance with the present invention a method for reducing or eliminating contaminants in soil formations as described above, wherein the soil contains substantial amounts of silt or clay, or is a tight bedrock formation, and wherein the contaminants are one or more of benzene, toluene or xylene, sometimes referred to as "BTX". This method includes one wherein the blend of liquid amendments and their component concentrations are controlled by an automated system, whereby the treatment of the soil formation having low initial permeability can be tailored to the specific requirements of said formation.

In accordance with the present invention, there is still further provided a method for creating a gradient of aerobic, denitrifying, and methanogenic degradation sequences in a soil formation which increases overall biodegradation efficiency, and thus provides an improved method for the bioremediation of non-naturally occurring, subsurface, liquid contaminants from one or more soil formations, which includes the steps of a) pneumatically fracturing the soil formation, including the steps of i) inserting a tubular probe partially into the soil such that at least one orifice of a nozzle fluidly connected with the tubular probe is positioned at a predetermined height; and ii) supplying a pressurized gas into the tubular probe such that the pressurized gas travels through the at least one orifice into the soil to produce a fracture network in said soil formation; and simultaneously with creation of said fracture network, or subsequently thereafter, b) inserting into said fracture network and thereby throughout adjacent portions of said soil formation, a pressurized gas stream, and introducing a mixture of one or more liquid amendments, selected from the group consisting of nutrients for growth of aerobic and other microorganisms, buffering compounds, and inoculum comprising aerobic and other microorganisms which are able to degrade said contaminants, and optionally water, into said pressurized gas stream, wherein said pressurized gas, in conjunction with said liquid amendments and optionally water, has an oxygen or other electron acceptor content sufficient to promote the growth of aerobic or other microorganisms in said fracture network and adjacent portions of said soil formation, and wherein said pressurized gas stream has a sufficiently high gas to liquid ratio to atomize said liquid amendments, whereby said amendments are distributed throughout said fracture network and adjacent soil formation; c) as necessary, repeating steps a) and b) on a sequential basis in order to treat additional portions of the soil formation(s), and on a periodic basis in order to replenish said liquid amendments and oxygen or other electron acceptor to said fracture network and adjacent portions of said soil formation(s); and d) maintaining a low volume flow of a pressurized gas throughout said fracture network and adjacent portions of said soil formation(s) by means of reduced pressure exerted thereon, wherein said pressurized gas has an oxygen content sufficient to promote the growth of aerobic microorganisms, whereby the gradient of microbial degradation is promoted, increasing the overall efficiency thereof.

There is further provided in accordance with the present invention an apparatus for reducing or eliminating non-naturally occurring, subsurface, liquid contaminants from one or more soil formations, which includes 1) fracturing means for pneumatically fracturing the soil formation, the fracturing means including a) tubular probe means for receiving i) a pressurized gas, the probe means including ii) a soil penetrating portion adapted to be inserted in a well in the soil formation, and iii) an above soil portion in fluid communication with the soil penetrating portion, the soil penetrating portion including tube means for receiving the pressurized gas; b) first and second packer means connected with the tube means for pressing against walls of the well so as to provide a sealed area in the well between the first and second packer means; and c) nozzle means positioned in the sealed area in fluid communication, with the tube means for supplying the pressurized gas to the soil formation, the nozzle means including at least one orifice therein which fluidly connects the soil formation with the tubular probe means; and d) pressurized gas supply means for supplying the pressurized gas to the above soil portion of the tubular probe means, wherein the pressurized gas travels through the at least one orifice into the soil to produce a fracture network; and 2) simultaneously with creation of the fracture network, or subsequently thereafter, means for introducing one or more liquid amendments, and optionally water, into a pressurized gas stream, wherein said pressurized gas, in conjunction with said liquid amendments, and optionally water, has an oxygen or other electron acceptor content sufficient to promote the growth of aerobic microorganisms in said fracture network, and wherein said pressurized gas has a sufficiently high gas to liquid ratio to atomize said liquid amendments, whereby said amendments are distributed throughout said fracture network; including a) separate supply means for independently supplying said one or more liquid amendments, including valve means associated with each supply means which control the flow and amount of liquid amendment from each supply means; b) mixing means in liquid communication with each and all of the liquid amendment supply means, and with a supply of water having a valve means, whereby water is optionally mixed with said one or more liquid amendments; c) pump means for introducing the contents of said mixing means under pressure into said above soil portion of said tubular probe means, coincidently with passage therethrough of said pressurized gas; d) nozzle means at the point of communication between the contents of said mixing means under pressure, and said above soil portion of said tubular probe means; and e) pressure regulating valve means between said pump means and said above soil portion of said tubular probe means to regulate and provide a sufficiently high gas to liquid ratio to atomize said liquid amendments and optionally water, whereby said amendments and optionally water are distributed throughout said fracture network.

The apparatus of the present invention further provides the means described above wherein said orifice has a substantially oral configuration and there are cone means positioned within said nozzle means for directing said pressurized gas through said orifice with substantially no pressure drop; said pressurized gas supply means includes compressor means for producing said pressurized gas; one or more holding tank means for holding a supply of said pressurized gas; and valve means for connecting said holding means with said tubular supply means in order to provide a rush of said pressurized gas to said tubular probe means. In addition thereto, the apparatus of the present invention further provides adjustment means for permitting relative movement between said first and second packer means in response to soil movement during a soil formation fracturing operation; including means for slidably connecting said first and second packer means; and including wherein said means for slidably connecting includes a different diameter tube on which said second packer means is mounted, said different diameter tube being slidable with respect to said tube means, sealing means for sealing said tube means with said different diameter tube, a rod connected to said tube means and extending through said tube means and out of said different diameter tube, and spring means engaged between said rod and said different diameter tube for biasing said second packer means toward said first packer means while permitting relative movement therebetween.

There is still further provided in accordance with the present invention An apparatus with separate, multiple parts which collectively form a system for reducing or eliminating non-naturally occurring, subsurface, liquid contaminants from one or more soil formations by establishing an in situ bioremediation cell therein to degrade said contaminants, which includes 1) fracturing means for pneumatically fracturing the soil formation, the fracturing means including a) tubular probe means for receiving i) a pressurized gas, the probe means including ii) a soil penetrating portion adapted to be inserted in a well in the soil formation, and iii) an above soil portion in fluid communication with the soil penetrating portion, the soil penetrating portion including tube means for receiving the pressurized gas; b) first and second packer means connected with the tube means for pressing against walls of the well so as to provide a sealed area in the well between the first and second packer means; and c) nozzle means positioned in the sealed area in fluid communication with the tube means for supplying the pressurized gas to the soil formation, the nozzle means including at least one orifice therein which fluidly connects the soil formation with the tubular probe means; and d) pressurized gas supply means for supplying the pressurized gas to the above soil portion of the tubular probe means, wherein the pressurized gas travels through the at least one orifice into the soil to produce a fracture network, and wherein said pressurized gas, in conjunction with said water and liquid amendments, has an oxygen or other electron acceptor content sufficient to promote the growth of aerobic and other microorganisms in said fracture network; 2) simultaneously with creation of the fracture network or subsequently thereafter, means for introducing one or more liquid amendments, and optionally water, into a pressurized gas stream having a sufficiently high gas to liquid ratio to atomize said liquid amendments and optionally water, whereby said amendments and optionally water are distributed throughout said fracture network; including a) separate supply means for independently supplying said one or more liquid amendments, including valve means associated with each supply means which control the flow and amount of liquid amendment from each supply means; b) mixing means in liquid communication with each and all of the liquid amendment supply means, and with a supply of water having a valve means, whereby water is optionally mixed with said one or more liquid amendments; c) pump means for introducing the contents of said mixing means under pressure into said above soil portion of said tubular probe means, coincidently with passage therethrough of said pressurized gas; d) nozzle means at the point of communication between the contents of said mixing means under pressure, and said above soil portion of said tubular probe means; e) pressure regulating valve means between said pump means and said above soil portion of said tubular probe means to regulate and provide a sufficiently high gas to liquid ratio to atomize said liquid amendments and optionally water, whereby said amendments and optionally water are distributed throughout said fracture network; 3) means for exerting reduced pressure on said fracture network and adjacent soil formation in order to maintain a low volume flow of a pressurized gas through said fracture network, wherein said pressurized gas has an oxygen content sufficient to promote the growth of aerobic microorganisms; 4) means for supplying said pressurized gas at a low volume flow; and optionally 5) means for passively supplying air to said soil formation.

The means for exerting reduced pressure on the fracture network is in particular a vacuum pump connected to one or more extraction wells. The optional means for supplying air comprise outlying wells which are vented to the atmosphere in order to provide passive air inlets to the fracture network and adjacent soil formation.

BRIEF DESCRIPTION OF THE DRAWINGS

FIG. 1 is a schematic representation of the first step of the method of the present invention, pneumatic fracturing of the soil formation to be treated.

FIG. 2 is a schematic representation of the second step of the method of the present invention, pneumatic injection of the liquid amendments, on a periodic basis, into the soil formation being treated.

FIG. 3 is a schematic representation of the third step of the method of the present invention, operating an in situ biodegradation cell within the soil formation being treated.

FIG. 7 is a schematic representation of a full-scale pneumatic bioinjection system for use with the method and apparatus of the present invention.

DETAILED DESCRIPTION OF THE INVENTION

Figure 4:
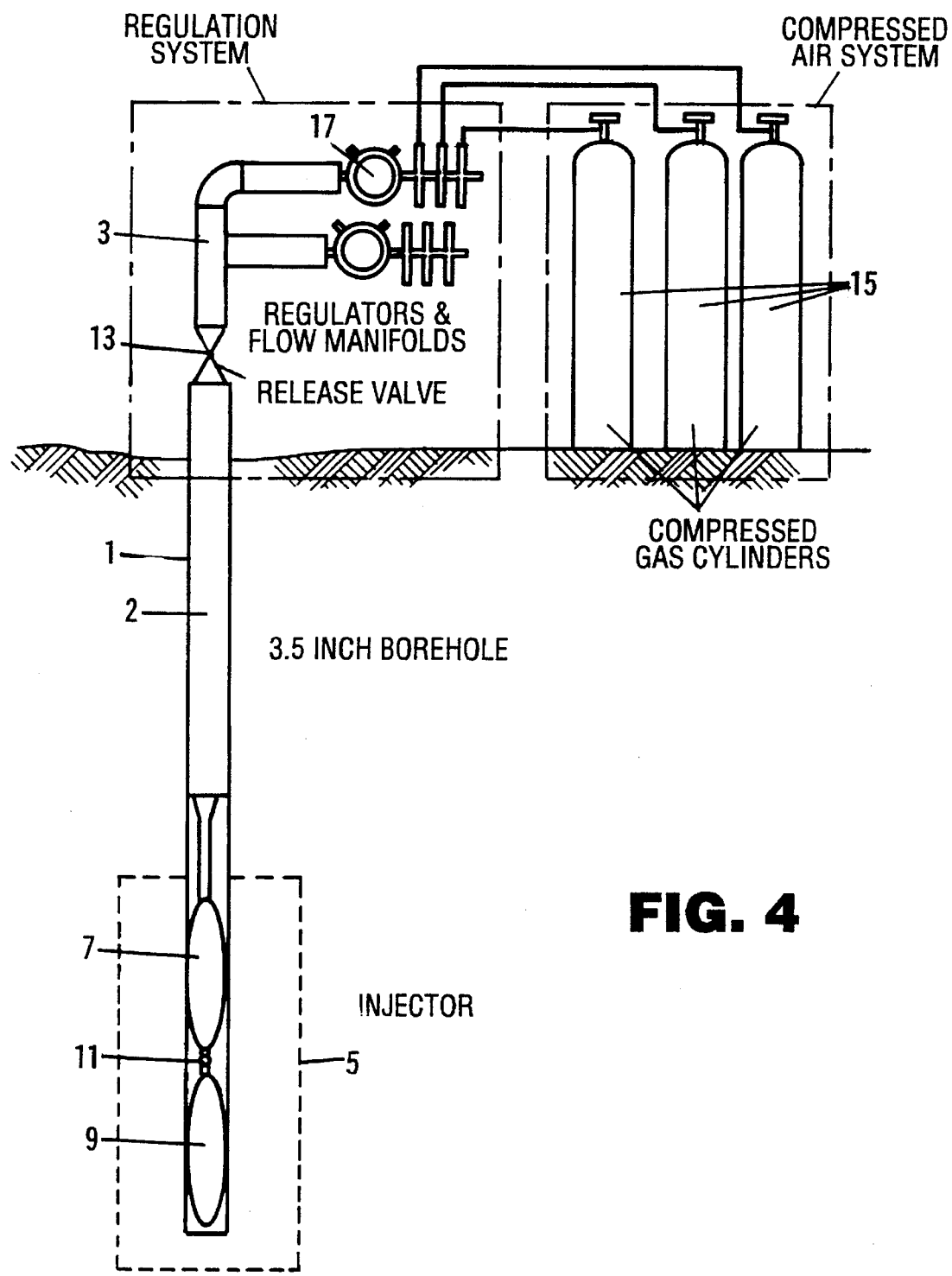
FIG. 4 is a schematic representation of the pneumatic fracturing apparatus for use with the method and apparatus of the present invention.

The present invention provides a method and apparatus by means of which pneumatic fracturing has been successfully integrated with bioremediation to provide unexpectedly enhanced in situ microbial processes, which result in surprisingly improved bioremediation results. Accordingly, the first step of the method is the pneumatic fracturing during which a sudden air surge imparts energy to the soil to break the surface tension of the contaminants adhering to the soil particles.

An overview of the method and apparatus of the present invention may be gained from FIGS. 1, 2 and 3, which depict in very schematic fashion the steps of the method. The first step, shown in FIG. 1, involves pneumatic fracturing of the soil formation to be treated, where an injector nozzle within a fracture well has created a series of fractures in the formation by the use of, e.g., high pressure and high flow rate compressed air. The parts of the system which accomplish this result are simply depicted as the "P. F. System", referring to the pneumatic fracturing system. The fracture well can later be converted to an extraction well, an example of which is shown further below. Two monitoring vent wells are also shown, which are passive and equipped with valves so that samples can be withdrawn periodically for analysis. The second step, shown in FIG. 2, involves pneumatically injecting biological amendments on a periodic basis into the soil formation being treated. The biological amendments are referred to herein as liquid amendments, and these are shown as the atomized liquid nutrients migrating into the soil formation from the fractures in the formation created in the first step. The source of the liquid nutrients is also shown in association with the pneumatic fracturing system in order to emphasize that the pressurized gas from that system is used to atomize and propel the liquid amendments out into the farthest reaches of the soil formation being treated. The third step, shown in FIG. 3, involves the operation of an in situ biodegradation cell in which a gradient zone of aerobic, denitrifying and methanogenic degradation activities have been established; and in which the fracture well has now been converted to a low flow extraction well by means of the vacuum pump which s shown.

Method for Pneumatic Fracturing

Pneumatic fracturing injects air and/or other gases into a soil formation at high pressures and high flow rates in order to create cracks or fractures in the soil formation. The air or other gas, which as a practical matter must be used in compressed form, is injected into the soil formation at a pressure that exceeds the in situ stresses that are present. The burst of air or other gas cracks the formation and creates horizontal fracture planes which extend out radially from the point of injection. For example, when compressed air is injected into an isolated section of a borehole in accordance with procedures described hereafter, the geologic formation involved will become stressed and eventually will fail when the breakdown pressure is reached. Upon failure, fractures will propagate perpendicular to the least principal stress in the formation, i.e., the air will take the path of least resistance. Low permeability soils, with which the present invention is particularly concerned, tend to be over consolidated, with the result that the least principal stress is in the vertical direction. Consequently, fractures will tend to extend horizontally from the injection point. The pneumatic fracturing process greatly increases both the permeability and the exposed surface area of the soil formation, thus allowing greater access to the areas of contamination. Pressure, however, is not the most important factor in determining the size of the fracture. High initiation pressures are not required to initiate shallow fractures, since fracture initiation pressures at depths of less than 20 feet are less than 200 psi for rock formations, and 100 psi for soil formations. A more important factor than the injection pressure is the injection flow rate. The greater the volume of air or other gas per unit of time injected into the soil formation, the further the resulting fracture will propagate, since the fracture initiation pressure is maintained over a greater area of the soil. Accordingly, it is necessary for the pneumatic fracturing system to deliver the air or other gas not only at high pressures, but also at high flow rates. Where these criteria are satisfied, it is possible to attain fracture radii in excess of 25 feet. These pressure and flow rate requirements can usually be met most economically by the use of air compressors of the type which are well-known and readily available. Set out below is a table of data on typical pressures and flow rates which have been employed in actual use.

TABLE 1

| No. | (feet) | Injection Pressure (psi) | Breakdown* Pressure (psi) | Inject'n Flow (scfm) | Inject'n Time (sec) | Comments |
| --- | --- | --- | --- | --- | --- | --- |
| 1 | 5.5–7.5 | 200 | — | 1200 | 7 | Aborted injection; blow-by observed |
| 2 | 5.5–7.5 | 150 | 117 | 1197 | 10 | |
| 3 | 5.2.7.2 | 175 | 34 | No data | 15 | |
| 4 | 3–5 | 150 | 17 | 2573 | 6 | |
| | 3–5 | 150 | 27 | 1543 | 10 | Blow-by |

TABLE 1-continued

| No. | (feet) | Injection Pressure (psi) | Breakdown* Pressure (psi) | Inject'n Flow (scfm) | Inject'n Time (sec) | Comments |
|---|---|---|---|---|---|---|
| | | | | | | observed |

*Breakdown pressure = the peak downhole pressure observed during injection.

Another important aspect of the pneumatic fracturing stage of the bioremediation process of the present invention is the durability of the soil formation fractures which have been created, i.e., whether or not the fractures will remain viable and whether or not reinjections will prove necessary to re-open the soil formation. A study of the impact of moisture on such fracture endurance, which correlated vacuum flow rates from extraction wells with soil moisture and precipitation, has revealed that the flow behavior for the extraction wells varies inversely with the soil moisture content. During periods of high water table and elevated soil moisture, vacuum flow rates were observed to decrease; while the greatest flow rates occurred when the soil was dry and the water table was below the fracture zones. However, it was also observed that despite periods of heavy moisture and successive dry spells, the soil formation fractures remained open and viable, and that in all cases, the flow rate observed at the end of the study period was at least one order of magnitude higher than that observed for the pre-fracture condition. It was also observed that soil formations can be effectively fractured despite heavy moisture conditions in the soil formation, although subsequently flow rates will be observed to increase substantially after a sustained dry spell. Conversely, moisture can have a retarding effect on air flow in a formation after it has been pneumatically fractured.

Apparatus for Pneumatic Fracturing

Typically, an apparatus, such as the one schematically depicted in FIG. 4, which is used to carry out this step, includes a tubular probe 1 having a soil penetrating portion 2 in fluid communication with an above soil portion 3. A double packer assembly 5 is connected to the lower end of the soil penetrating portion and includes an upper, elastic balloon-type packer 7 connected in surrounding relation to the soil penetrating portion, and a lower, elastic balloon-type packer 9 connected in surrounding relation to the soil penetrating portion and in spaced relation to the upper packer. When the soil penetrating portion is placed within a larger diameter well, and the packers are inflated, they tightly engage the walls of the well so as to create a sealed area between the packers in the well. A conventional drill rig (not shown) can be used for drilling the well. A nozzle portion 11 is formed as part of the soil penetrating portion, between the packers, and includes a plurality of circumferentially spaced orifices (not shown). The number of orifices can vary, e.g., the number of orifices can be two, four or eight.

The orifices in the nozzle preferably have oval-type configurations, although other configurations, such as a circular or the like, can be used. Preferably, a nozzle cone (not shown) is positioned inside the nozzle portion, with its larger base connected in sealing relation to the walls of the nozzle portion, immediately below the orifices. Thus positioned, the sloped walls of the nozzle cone direct the pressurized air out through the orifices. The above soil portion of the tubular probe 3 is connected through a quick release valve 13 to a holding or receiving tank 15 having a pressure gauge 17 associated therewith in order to measure the pressure within the holding tank. The holding tank, which can be a single tank, or a series of tanks 15 connected in series or parallel, in turn is connected to a compressor through a high pressure hose and air purification unit (not shown).

In operation, after the drill rig drills a well, the soil penetrating portion with the double packer assembly is inserted down the well to a first height. The air compressor then supplies pressurized air through the pressure hose and the air purification unit to the holding tank or tanks to provide a large supply of pressurized air within the holding tank(s). When the pressure within the holding tank(s) reaches a predetermined pressure, as determined by the pressure gauge, the quick release valve is opened to provide a sudden rush of pressurized air down the soil penetrating portion of the tubular probe. The arrangement of the nozzle cone assures that the air is pushed outwardly through the orifices with substantially no loss of pressure, i.e., that there is substantially the same pressure reading as with an open ended pipe. The sudden rush of pressurized air produces a first fractured soil formation. Thereafter, the double packer assembly and soil penetrating portion are inserted to a further depth and the operation is repeated to provide a second fractured soil formation, and so on.

In many instances, after the soil formation has been fractured, the soil will move. If the packers are fixed relative to each other, undue stress on the packer assembly may result. Thus, with a preferred apparatus, a second packer is movable in the axial direction with respect to a first packer. Specifically, the second packer is mounted to a smaller diameter tube, which is slidable within the nozzle portion. An O-ring seal or the like is provided therebetween to ensure a sealed arrangement. An annular flange is provided in surrounding relation to the smaller diameter tube near the upper end and normally abuts against the lower end of the nozzle portion to provide an additional seal prior to performing the fracturing operation. A rod extends through the smaller diameter tube, the nozzle portion and soil penetrating portion, and is fixed within the soil penetrating portion by a spider assembly or the like. The opposite end of the rod extending from the smaller diameter tube has a circular stop secured thereto, and a helical coil spring extends about the rod and is restrained between the stop and the lower end of the smaller diameter tube, so as to normally bias the smaller diameter tube, and thereby the second packer, toward the first packer. Upon fracturing of the soil by the sudden burst of air, the earth will separate, and accordingly, the second packer will move with the earth apart from the first packer to maintain the sealed arrangement and to prevent damage to double packer assembly.

Oxygen and Other Electron Acceptors Which Promote Biodegradation

The method and apparatus of the present invention optionally requires that the pressurized gas, in conjunction with the water and liquid amendments, have an oxygen or other electron acceptor content sufficient to promote the growth of aerobic or other microorganisms in the fracture network created by the above-described pneumatic fracturing procedures. The oxygen or other electron acceptor content of the soil formation being treated must be sufficiently high to support and enhance the growth of the aerobic or other microorganisms which are indigenous to the fracture network, or which are exogenous to the fracture network and introduced into that network in accordance with the procedures of the method of the present invention, said microorganisms being capable of degrading the contaminants in the fracture network. The expression "in conjunction with" as used in this connection, means that the pressurized gas, or the water and liquid amendments, or a combination of both, may be the source of the required oxygen or other electron acceptor.

Where the contaminants are benzene, toluene and xylene and other aromatic compounds, their biodegradation can occur, with regard to the chemistry of such degradation, in a number of different environments characterized by different redox systems, e.g., aerobic, where oxygen is present and is the electron acceptor; anaerobic denitrifying, where oxygen is limited and nitrate is used as an electron acceptor; and anaerobic methanogenic, where highly reduced conditions are present and carbonate serves as the electron acceptor. Other redox systems potentially exist, e.g., those involving iron, sulfur, and manganese as electron acceptors, but do not usually have a sufficient impact on the course of biodegradation of contaminants in soil formations to warrant further discussion here. However, the method of the present invention, using the description herein, could be adapted to operate effectively in such environments as well. Giving due consideration to the thermodynamics of the reactions involved, it is clear that biodegradation of benzene, toluene, xylene and other organic substrates favors the aerobic pathway, where oxygen is the most favored electron acceptor. However, because oxygen is not always available in contaminated soil formations, or portions of such formations, requiring bioremediation, in accordance with the method of the present invention, alternate electron acceptors are provided as part of the addition of liquid amendments, utilizing the next most oxidized species in the thermodynamic efficiency gradient. This ladder or redox tower, is constructed in order of the strongest reductants at the top of the ladder, i.e., those with negative reduction potentials, to the strongest oxidants at the bottom of the ladder, i.e., those with positive reduction potentials.

After oxygen, nitrate is the next most favorable electron acceptor for the purpose of initiating and prolonging biodegradation of aromatic organic compounds. The thermodynamically least favorable process is that which uses carbonate or carbon dioxide as an electron acceptor. Methanogenic bacteria are the strictest anaerobes known and require an absolutely oxygen-free environment with a very low redox potential, i.e., less than −330 mV. This methanogenic biodegradation process has the corresponding advantage of not usually requiring the addition of an electron acceptor to the contaminated soil formation. Methanogenesis is also very pH sensitive, with an optimum between 7.0 and 7.2. However, despite these limitations, it is contemplated that there may be bioremediation problems that require the addition of an electron acceptor and optionally inocula of anaerobic methanogenic microorganisms, which may be accomplished readily and effectively using the method and apparatus of the present invention. For example, the pressurized gas can be carbon dioxide, and it can be used as a carrier for seeding inocula of methanogenic bacteria into the contaminated soil formation. The carbon dioxide would also operate to sweep any ambient oxygen out of the formation, thus further promoting the growth of the methanogenic bacteria, with a resulting improvement in the overall bioremediation.

Available oxygen in the soil matrix is often a limiting factor for in situ bioremediation, and will determine whether aerobic or anaerobic processes are dominant. As already discussed, efficient bioremediation processes are preferably aerobic processes, since these produce more energy, which in turn tends to accelerate the reaction rates of the biodegradation process. Consequently, control of available oxygen is critical to the success of a bioremediation program. However, the intense microbial activity required by the biodegradation process in bioremediation quickly depletes available oxygen in the soil formation before it can be replaced by natural soil diffusion. The contamination zone thus becomes anaerobic, which will either retard or altogether prevent further biological degradation. This problem is compounded by the fact that as the zone of contamination travels further below the surface, atmospheric air must diffuse ever deeper into the soil. In fact, the deeper the contamination is, the less oxygen there will be for degradation.

Methods of increasing the amount of available oxygen in subsurface soil formations have utilized aeration, pure oxygen, nitrate, hydrogen peroxide, and nitrate/ozone. Aeration of the soil is the most economical approach, and is most efficiently carried out by establishing bioventing systems in the vadose zone, which is carried out by injection, extraction, or a combination of the two. Saturated zones present a particular challenge, where aeration produces an oxygen level of only about 8 mg/L; and saturation of the water with pure oxygen, or the addition of hydrogen peroxide have been used instead. A level of 200 ppm of $H_2O_2$ will produce an oxygen concentration of 94 mg/L. However, since hydrogen peroxide is toxic to microorganisms at higher concentrations, initially it should be used in small amounts. Concentrations can then be increased as the microorganisms adapt to its presence. Eventually, concentrations of up to 1000 mg/L may be tolerated. Hydrogen peroxide, which can be unstable, is often stabilized by compounds such as phosphates, which can also serve as nutrients for the microorganisms. Nitrates can serve as electron acceptors in place of oxygen under anaerobic conditions, as discussed further below; and ozone has been used to treat recirculating water by oxidizing its contaminants, while nitrates are returned to the soil to aid in degradation. There have been very few instances, however, of successful replacement of oxygen by nitrates in a full scale in situ bioremediation system. Furthermore, all of the above-described methods of oxygen enhancement suffer from the disability of being greatly inhibited by the permeability of the soil formation which is being treated. Fine grained soils pose serious problems for distribution of the oxygen, whether in the liquid or vapor phase. It is for that reason, namely the lack of adequate distribution of the oxygen or other electron acceptor to the contaminated soil formation to be treated, that the method and apparatus of the present invention represents such a significant advance in the bioremediation field. Using the present invention, it is possible to achieve dramatically improved results in the removal of contaminants, compared to those which have been obtained heretofore using the methods of the prior art.

In the method of the present invention where the electron acceptor is oxygen, typically, the pressurized gas will be compressed air, and ambient air has an adequate oxygen content for the purpose of supplying the needed oxygen under ordinary circumstances. Thus, the use of compressed air as the pressurized gas is the preferred manner of carrying out the method of the present invention. Accordingly, an oxygen content of from about 15% to about 30% by volume of the gas overall, preferably from about 18% to about 25% by volume, and more preferably about 20% to about 23% by volume will typically be employed. While the use of compressed air represents the most economical alternative, there may be situations where the bioremediation of a contaminated soil formation requires that quantities of oxygen be supplied to the formation which are not available from the use of compressed air alone as the pressurized gas. In that event, the use of supplemental oxygen sources in the form of the liquid amendments of the present invention may be employed to increase the amount of oxygen available to the aerobic microorganisms present in the soil formation. Further details of such an option are discussed in detail elsewhere herein.

There are certain types of soil formations, e.g., saturated zones, where aeration may not be adequate to supply the necessary quantity of oxygen to the formation, or where anaerobic biodegradation is already in progress. In such situations, it may be desirable to use an electron acceptor other than oxygen to be supplied by a pressurized gas other than compressed air, using a liquid amendment comprising the electron acceptor. This option is discussed further below.

The method and apparatus of the present invention may be used to remove oxygen from the soil formation being treated, as well as to introduce it in the above-described manner. Where it is desired to achieve anaerobic conditions in order to promote a certain type of microbial activity, the soil formation being treated can be injected with nitrogen or some other oxygen-free gas in order to purge the subsurface of oxygen. For this purpose there could be used a nitrogen generator, which is a commercially available separator which filters the majority of oxygen out of ambient air and passes the nitrogen and other non-oxygenated gases through. In certain situations, the increased permeability in the soil formation achieved with the pneumatic fracturing allows the formation to be flooded with water, which will tend to make the system anaerobic, Liquid Amendments An "amendment", as the term is used herein, and as ordinarily defined, means a substance that aids plant growth indirectly by, improving the condition of the soil. With respect to the present invention, it means a substance that aids microorganism growth indirectly by improving the condition of the subsurface soil formation.

The method and apparatus of the present invention involve optionally introducing a mixture of one or more liquid amendments and optionally water into a pressurized gas stream, wherein said pressurized gas, in conjunction with said liquid amendments, has an oxygen or other electron acceptor content sufficient to promote the growth of aerobic and other microorganisms in said fracture network, and wherein said pressurized gas has a sufficiently high gas to liquid ratio to atomize the liquid amendments, which results in the liquid amendments being distributed throughout the fracture network. The liquid amendments serve a number of different functions, all of which, however, are directed toward the goal of enhancing and promoting the growth and activity of the microorganisms in the contaminated soil formation which will directly increase the extent of biodegradation of the contaminants.

Figure 5:
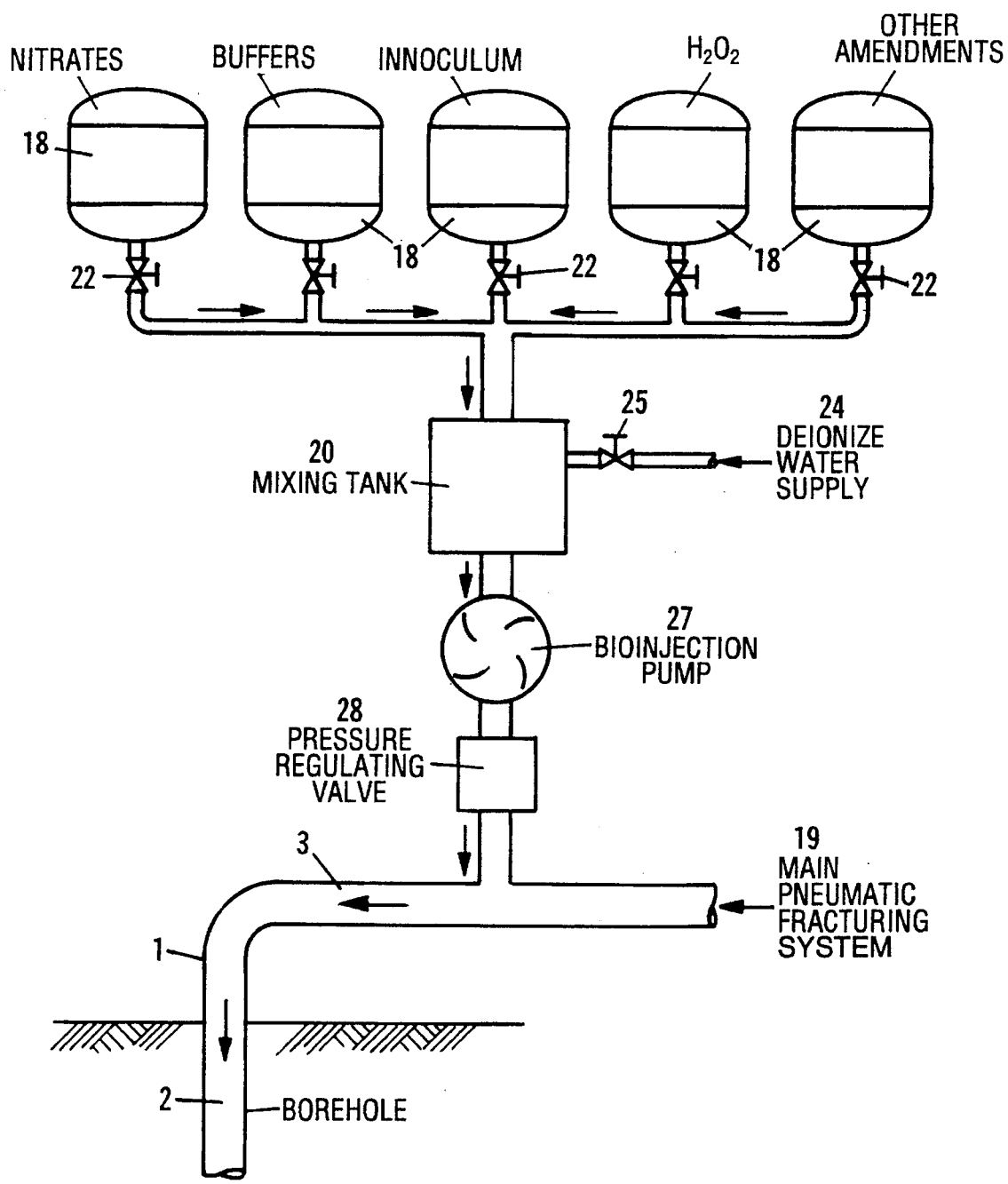
FIG. 5 is a schematic representation of the pneumatic bioinjection apparatus for use with the method and apparatus of the present invention.

The bioinjection method of the present invention, and apparatus means which may be used to carry it out, are shown schematically in FIG. 5. Supply means 18 are depicted which are in fluid communication with a mixing tank 20, and which contain various liquid amendments, e.g., nitrates, buffers, inoculum, hydrogen peroxide, and other amendments, which car be metered by means of the valves 22 to the mixing tank 20. Thus, any combination or amount of these amendments can be used. A supply of deionized water 24 is also provided and in fluid communication with mixing tank 20, which is also controlled by a valve 25 so that any amount, or none at all, of deionized water may enter the mixing tanks 20. After the liquid amendment(s) and any deionized water to be used are mixed together, they then pass through the bioinjection pump 27 by means of which pressure is applied to the liquid amendments, and maintained by the pressure regulating valve 28, which can also have an on/off valve incorporated therein. The liquid contents of the mixing tanks 20 which have passed through the bioinjection pump 27 and pressure regulating valve 28, now pass into the above soil portion 3 of the tubular probe 1, and are atomized by their sudden release under pressure into the high pressure, high flow rate stream of compressed air, supplied from the main pneumatic fracturing system 19, and passing through said tubular probe 1 to the soil penetrating portion 2 thereof, on its way to the injection nozzle (not shown).

Nitrate Electron Acceptor

Where benzene, toluene and xylene (BTX) are contaminants, it has been found that aerobic microorganisms near the fracture interface use BTX as a carbon source and oxygen as an electron acceptor. At distances away from the fracture surface, in the oxygen depleted zones, it has been found to be necessary to supply nitrates in order to provide an alternate electron acceptor. This has been accomplished by using aqueous solutions of nitrate salts as liquid amendments for delivery by the method of the present invention. This has been accomplished by calculating the stoichiometric nitrate requirement using the work of Evans et al., "Anaerobic Degradation of Toluene by a Denitrifying Bacterium", *Appl. Env. Microb.* 57(4), 1139–1145, 1991. From these calculations it has been estimated that 4.5 moles of nitrate are required for 1 mole of BTX. The nitrate salt which has been used is calcium ammonium nitrate dehydrate, $[Ca(NO_3)_2]_5 \cdot NH_4NO_3 \cdot 10H_2O$. Buffers in the form of potassium dihydrogen phosphate, $KH_2PO_4$, and potassium hydrogen phosphate, $K_2HPO_4$, have been added to the solution, but in very small amounts. A typical liquid amendment solution of this type is prepared by mixing 25 kg of nitrate salt in 50 L of distilled water until dissolved. The nitrate salt has the significant advantage in this situation of being highly soluble in water.

It is not only oxygen that the microorganisms require to satisfactorily complete the process of biodegradation, but nutrients as well. Since microorganisms use organic compounds as feedstocks, biodegradation relies on the use by microorganisms, under ideal conditions, of the contaminant to be degraded as a substrate that serves as the electron donor. In the presence of an external electron acceptor, the contaminant is oxidized eventually to harmless products, while the receptor becomes reduced. The energy generated by these reactions are used by the microorganism to contribute to cell growth, while the carbon compound is converted, under optimum conditions of temperature: between 8° and 30° C.; pH: between 6.0 and 8.0; and moisture content, into harmless metabolic end products such as carbon dioxide, methane and water. In particular, biodegradation of benzene, toluene and xylene generally favors aerobic over anaerobic pathways. As already mentioned, aerobic respiration is the most energetically favored of the coupled reactions.

Nutrients

The nutrient requirements for in situ bioremediation will ultimately depend on the particular characteristics of the site which is to be treated. In some cases, the addition of nutrients may not even be necessary. This will not, however, usually be the case, and nutrients will be required, especially where the site is one which is heavily contaminated with organics. As with oxygen, microorganisms actively engaged in biodegradation will use up the available nutrients faster than they can be replaced. Heretofore, efforts have been made to make an application of nutrients, e.g., common fertilizers, to assist ongoing bioremediation by adding them through injection wells and infiltration galleries. The success of these methods, however, has depended on the extent of the diffusion of the nutrients throughout the soil formation, which has, in turn, depended on the permeability of the soil. Influencing nutrient levels, especially deep in low permeability formations, has proven difficult with existing technology. The pneumatic fracturing integrated with injection bioremediation which is provided by the present invention significantly enhances nutrient application. Nutrients move along the fractures of the fracture network, allowing for faster dispersion. Also, the increased surface area created by the fracturing of the soil formation allows for a greater volume of soil to be effectively treated, which in turn, requires the application of a greater volume of nutrients. An aqueous solution of nutrients is atomized by the pressurized liquid spray nozzle and propelled into the contaminated soil formation for a considerable distance. As a result, the indigenous microorganisms receive the nutrients which they require in a matter of seconds, rather than having to wait for those same nutrients to slowly diffuse through the soil.

The nutrient application provided for by the present invention can be combined with other methodologies currently in use. For example, where there is contamination in the shallow zones of a formation, it is possible to combine surface application with the method of the present invention. This requires that the fractures reach or "daylight" the ground surface, so that the liquid will penetrate into the formation. For deeper contamination zones, the method of the present invention can be combined with wells for the addition of nutrient solutions. Where low permeability formations are involved, it is necessary for the fractures provided by the method of the present invention to intersect the wellbores in order for that additional method to be effective.

pH

Another significant factor for the growth rate of microorganisms is the pH of their environment. Optimally, that pH is neutral or nearly neutral. There are circumstances, however, where a species of microorganism will be dominant in a contaminated soil formation, and will be determined to be one which thrives under more acidic or alkaline conditions. In such a situation, it may be desirable or necessary to radically change the pH of the soil formation. To make the soil more acidic, for example, it would be expedient to simply add an acid as one of the liquid amendments to be added by the present invention. As a practical matter, however, most bioremediation situations require the activity of a group of microorganisms. To satisfy the needs of such a diverse group, an average, neutral pH is usually best. As the biodegradation process proceeds, it will most often produce organic acids which lower the pH; and nitrogen from nutrient applications will also tend to make the soil slightly acidic. In order to improve the pH conditions, i.e., restore the pH of the soil formation neutral or near neutral, it is expedient to dissolve lime or caustic lime in water and use it as one of the liquid amendments of the present invention. Adjustment of the pH can also be used on a regional or local basis, e.g., a buffer could be added to the nutrient liquid amendment in order to insure that a region of soil which is being treated does not turn acidic as a result of the biodegradation. Where a localized zone is highly acidic or basic, while the remainder of the formation is near neutral, the method of the present invention provides the ability to control the pH within that specific zone, safely and efficiently, with minimal impact on the remainder of the formation. In methods used heretofore, one would have been forced to treat the entire formation, or not treat at all.

Temperature

Temperature of the soil formation is yet another factor which is important to the outcome of the bioremediation process, since the growth and activity of the microorganisms is directly related to temperature. Most microorganisms involved in in situ bioremediation are mesophiles which grow best in the range of 25° to 40° C. While soil will absorb significant quantities of energy before the temperature of the soil rises appreciably, it is possible in colder climates, e.g., Alaska, to use warm water to control subsurface temperatures. Accordingly, it is contemplated to be a part of the present invention to use heated water, e.g., to 35° C., as the water which is applied to the soil formation being treated. Under these conditions, the warm water can elevate the soil temperature sufficiently to permit significant biodegradation to proceed.

Moisture

Moisture can also be a limiting factor for microbial growth in the soil formation being treated. The dramatic improvement in permeability of such a soil formation provided by the pneumatic fracturing which is a part of the method of the present invention, aids in control of the moisture of the soil in several ways. First, because of the fractures which have been created, it is easier to add water, e.g., by infiltration wells and trenches, or simply at the surface; or to remove water, e.g., through extraction wells. Second, and more importantly, using the water and liquid amendment injection coupled with pneumatic fracturing provided by the present invention, fine, atomized water droplets are dispersed widely throughout the soil formation being treated. Where, conversely, is desired to remove moisture from the soil formation, the method and apparatus of the present invention are also particularly useful, since they can readily be used in conjunction with a vacuum pump to efficiently remove water from a localized section of the soil formation.

Access to Contaminants

In order for microorganisms to successfully biodegrade contaminants in a soil formation, they must have access to the contaminants. On a macroscopic level, lack of access may simply be the result of irregular spatial distribution of the microorganisms in the soil formation, which can be remedied by adding microorganisms to the more sparsely populated zones. On a microscopic level, problems have often been encountered because the contaminants are absorbed onto soil particles, which interferes in some way with the access of the microorganisms to the contaminants. It would be expedient, and is contemplated to be a part of the present invention, to use one or more surfactants as one of the liquid amendments of the present invention, so that when distributed throughout the soil formation, the surfactant would desorb the contaminant from the soil particles to which they had become attached.

Microorganism Augmentation

While in most bioremediation, indigenous microorganisms are used without augmentation, it is sometimes desirable or necessary to add a different culture of microorganisms to the soil formation. This could occur as the result of the basic inability of the indigenous microorganisms to degrade the contaminants involved; or it could result from natural limiting factors in the soil which prevent a microbial species that would otherwise be capable of degrading he contaminants, from reaching a critical population size which permits it to be active with respect to degrading the contaminants. Microorganisms which are added to the soil formation will either be acclimated or genetically engineered. Acclimated microorganisms are produced as the result of selective pressures applied in the laboratory, e.g., conditions which require them to degrade compounds which are the same as the contaminants, in order to survive. The culture will evolve into one which efficiently degrades the compounds. The original inoculant for this acclimatization process is often taken from the contaminated soil formation which is to be treated. Genetically engineered microorganisms have shown promise in degrading hazardous wastes; but being wholly exogenous, they suffer from the drawback of being potentially vulnerable to elimination by some unknown pathogen, or marginalization by a competing microorganism native to the soil formation. Another problem heretofore with microorganism augmentation, has been the permeability of the soil formation being treated, which inhibits diffusion throughout the formation. In accordance with the method and apparatus of the present invention, it is possible to use a microorganism inoculum as one of the liquid amendments which be can applied to the soil formation, with assurance of widespread diffusion and dispersion throughout that formation.

Parameters for Microbial Growth and Activity

Following is a table summarizing data for the above-discussed parameters.

TABLE 2

| Environmental Factor | Optimum Level |
| --- | --- |
| Oxygen | Aerobic: More than 0.2 mg/L dissolved oxygen or more than 10% of air space filled with air Anaerobic: Less than 1% oxygen |
| Moisture | 25% to 85% of water holding capacity |
| Nutrients | Enough nutrients, i.e., nitrogen and phosphorus, to insure that they are not a limiting factor |
| Soil pH | Neutral, usually between 5.5 to 8.5 |
| Temperature | Mesophilic range: 15°–45° C. |
| Contaminant concentration | Varies depending on the compounds present |
| Microorganism acclimation | Contamination present for over 12 months |

Integrating Pneumatic Fracturing to Enhance In Situ Bioremediation

The major goal of integrating pneumatic fracturing to enhance in situ bioremediation is to gain better control over the many factors which affect and determine microbial growth in the soil. Pneumatic fracturing provides three options for enhancing in situ bioremediation, which may be used individually or in combination, with a combination being the likely preference. The first option is bioventing, which is a system for circulating atmospheric air, through inlet wells and into the formation being treated, in order to enhance levels of available oxygen in the formation. Bio-iniecton of nutrients, microorganism inocula, and any other desired agent, is then carried out by adding a liquid spray to the same high pressure air stream used to fracture the formation. Pneumatic injection of life supporting solutions directly into the biologic activity zone accelerates degradation rates and avoids lengthy diffusion times associated with borehole applications used heretofore.

Figure 6:
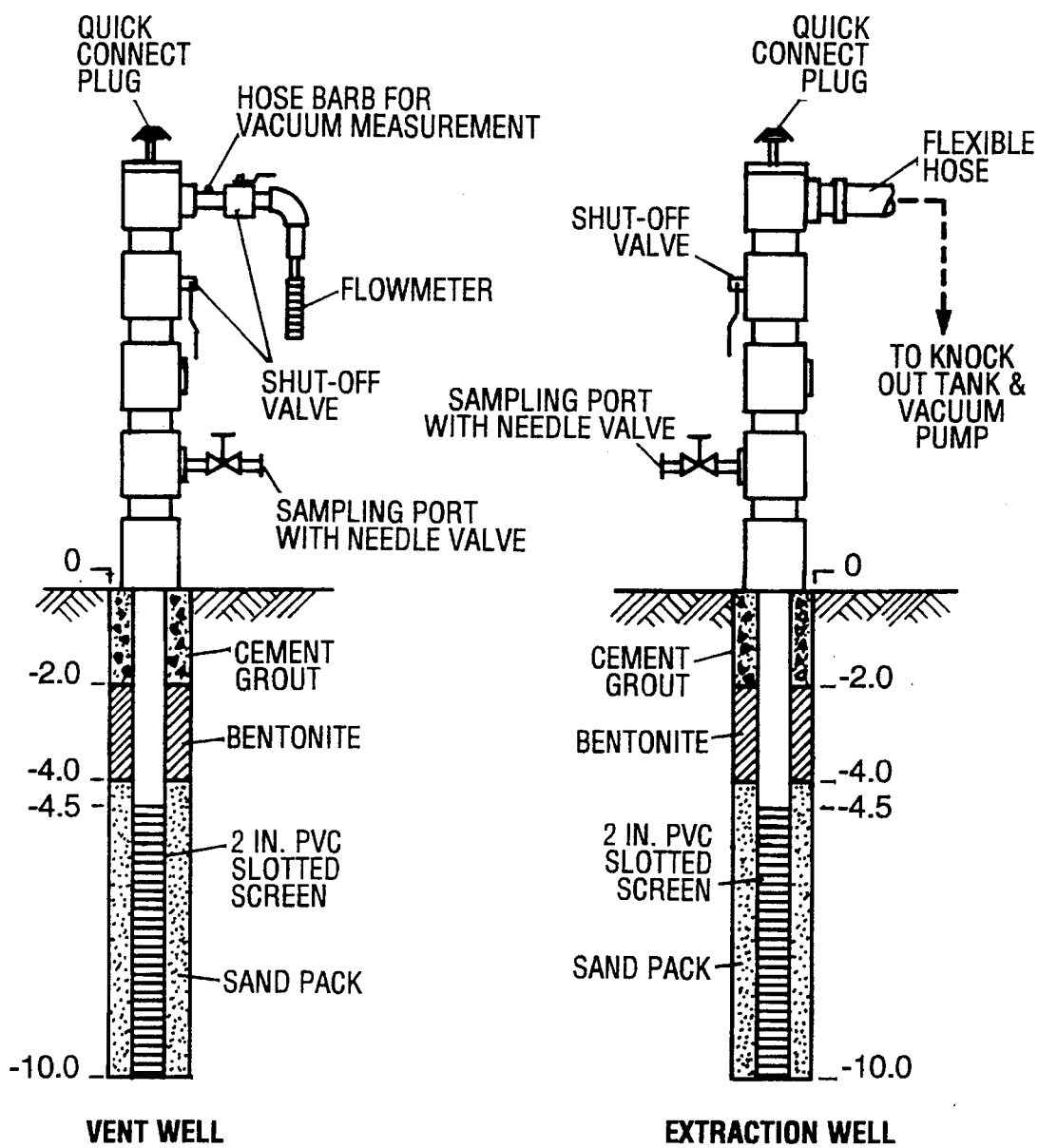
FIG. 6 is a schematic representation of a typical vent well and extraction well design for use with the method and apparatus of the present invention.
Figure 8:
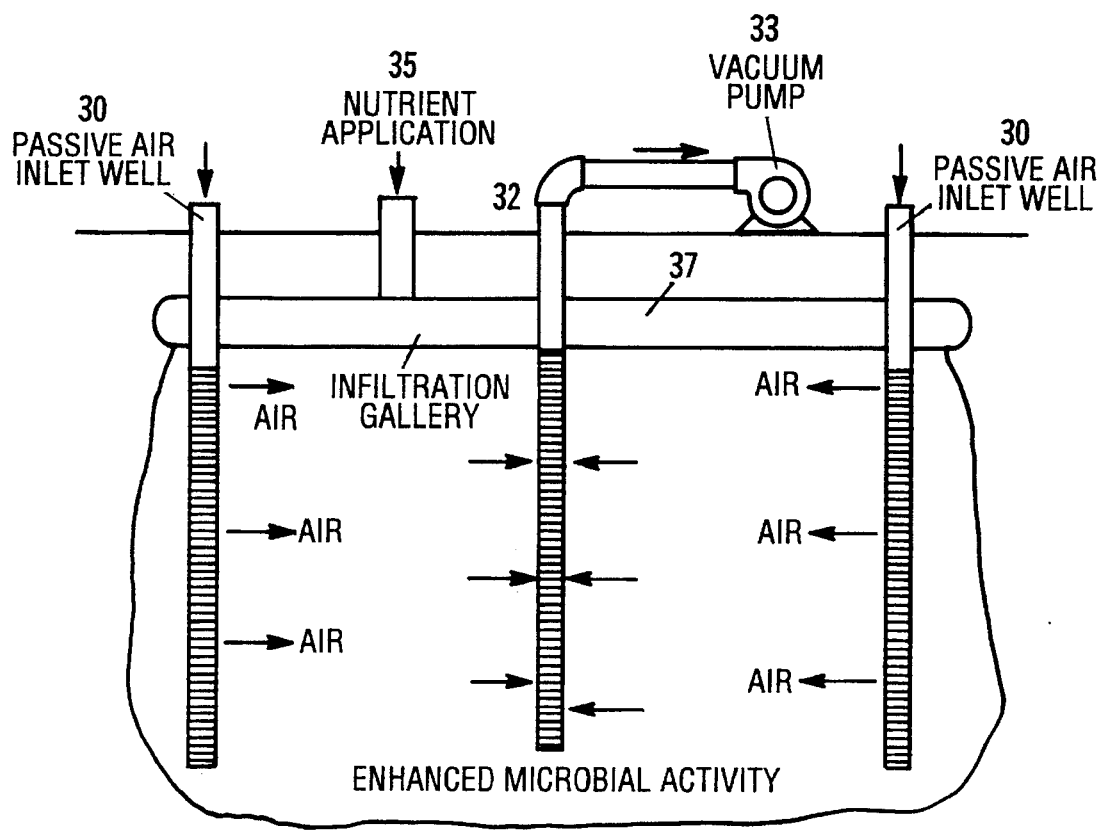
FIG. 8 is a schematic representation of a bioventing system for use with the method and apparatus of the present invention.

Such a conventional bioventing system is depicted in FIG. 8, where the passive air inlet wells, or vent wells, 30 are shown, together with an extraction well 32 operated by a vacuum pump 33. Microbial activity is enhanced by the air moving through the soil formation, and nutrients may be applied by way of an infiltration gallery 37. Further details regarding vent well and extraction well design are shown in FIG. 6. In this illustration, the head of each vent well is equipped with a sampling port with needle valve, a hose barb for vacuum measurement, and a rotameter for air flow measurement. Valves are incorporated into the well head to isolate the various well head functions. The head of the extraction well is similar to that of the vent well, except that the top is connected to a vacuum source instead of a rotameter. The sampling port is located close to the ground surface to minimize the potential for cross contamination when tests are being conducted. This conventional method can be substantially improved by combining it with the pneumatic bioinjection of the present invention.

Another option for in situ bioremediation enhancement by pneumatic fracturing is the standard pump and treat system used in conventional bioremediation projects. It has been discovered that water has the ability to move through the fractures in a soil formation created by pneumatic fracturing, including siltstone and clayey silt formations. Using the method of the present invention, effluent water would be treated and then augmented with nutrients, hydrogen peroxide, or other desired liquid amendments, before being reinjected into the subsurface. The increased permeability in the formation created by the pneumatic fracturing would allow a dramatic improvement in the fluid movement throughout the soil formation. The actual method of reapplying the treated water will depend on the results of the pneumatic fracturing. If the fractures reach the ground surface, then a surface application would be suitable. If the fractures intersect the monitoring wells, then the liquid amendment could be applied through the well screens.

Yet another option would be to use an air vacuum pump instead of a water pump to remove water from the soil formation. By using a high vacuum, high flow rate vacuum pump, both water and air could be extracted simultaneously from a well. The effluent water could be treated and then reinjected as described above, while oxygen would circulate throughout the soil formation by means of the vacuum extraction. Any effluent air would be treated by conventional methods, e.g., activated carbon filtration. By circulating air and water simultaneously, the formation would remain aerobic, as well as moist.

Where a full scale, in situ bioremediation project for a contaminated soil formation was established, and was enhanced by pneumatic fracturing, it probably would utilize a combination of the above-outlined options. Supplementing convention surface and well infiltration methods with pneumatic bio-injection of liquids allows a given volume of contaminated soil to be more effectively treated. Increased soil formation permeability allows greater control over crucial subsurface microbial growth parameters.

DESCRIPTION OF THE PREFERRED EMBODIMENTS AND BEST MODE CONTEMPLATED OF CARRYING OUT THE INVENTION

The following descriptions of the preferred embodiments of the present invention and best mode contemplated of carrying out that invention, are only intended to be an illustration of the present invention, and should not in any way be construed as a limitation of the scope of the present invention.

EXAMPLE 1

Pneumatic fracturing was used to improve the in situ biodegradation of petroleum hydrocarbons in a low permeability soil, widen a field-scale pilot demonstration was carried out at a petroleum refinery over a period of 20 months. Initial site characterization indicated low subsurface permeability and the presence of benzene, toluene and xylene at concentrations ranging up to 1500 ppm in the soil phase. An in situ bioremediation cell was established at the site by pneumatically fracturing the site, followed by periodic amendment injections over a period of 12 months. Subsurface injections include introduction of nitrate and ammonia in the form of calcium ammonium nitrate salt to facilitate development of aerobic, denitrifying and methanogenic biodegradatbon zones with respect to increasing distance from the fracture interface. Off-gases from the monitoring wells were analyzed periodically for benzene, toluene, and xylenes (BTX), oxygen, methane and carbon dioxide to evaluate process effectiveness.

In this study, nitrate served as an alternate electron acceptor and helped develop a denitrifying population, to biodegrade the organic contaminants into carbon dioxide and water. The thermodynamically least favorable metabolic pathway for BTX biodegradation was known to be methanogenesis, which occurs under strictly anaerobic conditions and results in the generation of methane. In the absence of oxygen and nitrate as electron acceptors, methanogenic activity is increased and methane generation is enhanced. This classic thermodynamic hierarchy of biodegradation pathways was observed in this field study. Following each nitrate injection, methane concentration in the wells decreased, while the carbon dioxide concentration increased, indicating a shift toward aerobic and denitrification processes with the increased availability of their respective electron acceptors, and away from methanogenesis.

After one year of sampling and monitoring, soil samples obtained from the site showed a 79% reduction in soil-phase BTX concentrations. Results from the analysis of soil samples obtained from four distinct 2-foot sections of the soil bed in the pre-demonstration stage were compared to those frown the post-demonstration stage. From these results, the total m ass of BTX removed, based on BTX concentrations, was computed to be 22 kg or 79%. Based on periodic soilgas sampling, the mass of BTX removed through vapor extraction was computed to be 3.1 kg or 12%. Vapor extraction was the predominant abiotic mode of BTX removal. The other abiotic pathways of BTX losses occurred through fracture and amendment injections, perched water removal and passive volatilization, accounting for a total of 0.8 kg or 4% based on meaxn BTX concentrations. The total of BTX removal, therefore, was 95%.

In order to independently confirm the results calculated for biodegradation losses, a mass balance was made on the nitrate introduced into the system. Based on the mass balance calculations, 790 moles were depleted indicating an active denitrifying microbial population in the soil bed. Although the nitrate depletion and off-gas composition did point toward an active biodegradation process, several constraining factors made it impractical to independently determine the mass of BTX biodegraded. Hence, all possible BTX losses wet accounted for, and the mass of BTX removed by biodegradation was computed by difference. Based on these calculations, over 84% of the BTX reduction can be assigned to bioremediation, demonstrating the synergistic effect of the two processes.

Several useful operational guidelines were recognized during the demonstration. Positive control in the formation is essential. Following initial fracturing of the site, rain water began to accumulate in the fracture zone, apparently entering through shallow or surface fractures. As excessive moisture in the fractures inhibited formation air flow, several measures were taken to control water accumulation, including installation of a polyethylene surface cover and operation of an automatic dewatering system. To effectively use the combined effects of the vapor extraction and the bioremediation technologies, moisture control is essential. The high gas to liquid ratio used during injection of the soil amendments was advantageous during the demonstration. The liquids were thoroughly atomized upon injection, resulting in superior penetration into the geologic formation. The high air content also provided substantial amounts of oxygen to the formation. Oxygen consumption and dinitrogen production should be constantly monitored throughout the demonstration. This would allow a more complete mass balance calculation for the biodegradation processes. Analysis of the off-gas results suggested that nitrate application frequency to the formation could have been increased to accelerate BTX reduction. This was evident from the significant drop-off of biomarkers one to two weeks following an injection. It is believed that higher BTX degradation rates are possible by injecting nitrates more frequently. The actual schedule of amendment injections during the project was controlled by equipment and staff availability.

EXAMPLE 2

In order to carry out the bioinjection procedure of the method of the present invention, the necessary equipment had to be assembled. The main piece of equipment selected for the task of injecting a liquid into the air stream was a Graco, President series 10:1 air powered pump which can generate liquid pressures of well over 1000 psi. The designation 10:1 indicates that an incoming air pressure of 20 psi will theoretically produce an outgoing liquid pressure of 200 psi. To atomize the liquid a spray nozzle was placed at the connection of the liquid hose and the pneumatic fracturing system. Various sizes of nozzles with design flow rates ranging up to 6 gallons per minute of liquid were obtained. The other major component of this system was a J. D. Gould model BHP-⅜ in. solenoid valve which opens and closes the liquid injection line electronically. This was placed as close to the pneumatic fracturing injection piping as possible to minimize the pressure drops across the hose during injection. The details of this apparatus are depicted schematically in FIG. 7.

The first series of tests with the pneumatic bioinjection system focused on optimization of the air powered biopump. Experiments consisted of using various air supply pressures and flow rates to collect data on liquid pressures and flowrates produced by the pump. These data were used to develop an gas to liquid ratio which could predict the liquid effluent pressure based upon inlet air pressure. Although the pump is designed to have an gas to liquid ratio of 0.1, actual measured values indicated that the ratio averaged about 0.3. This disparity was attributed to head losses in the system. System flow rates were then measured to find the pump configuration that allowed the greatest flowrate while still maintaining a large liquid pressure. Maximum liquid flowrates for this pump were listed at 3 gallons per minute for continuous duty, or 6 gallons per minute for intermittent duty. Based on the intended use of the pump, it was decided that a flowrate of 4.5 GPM would be a safe target level.

Figure 7:
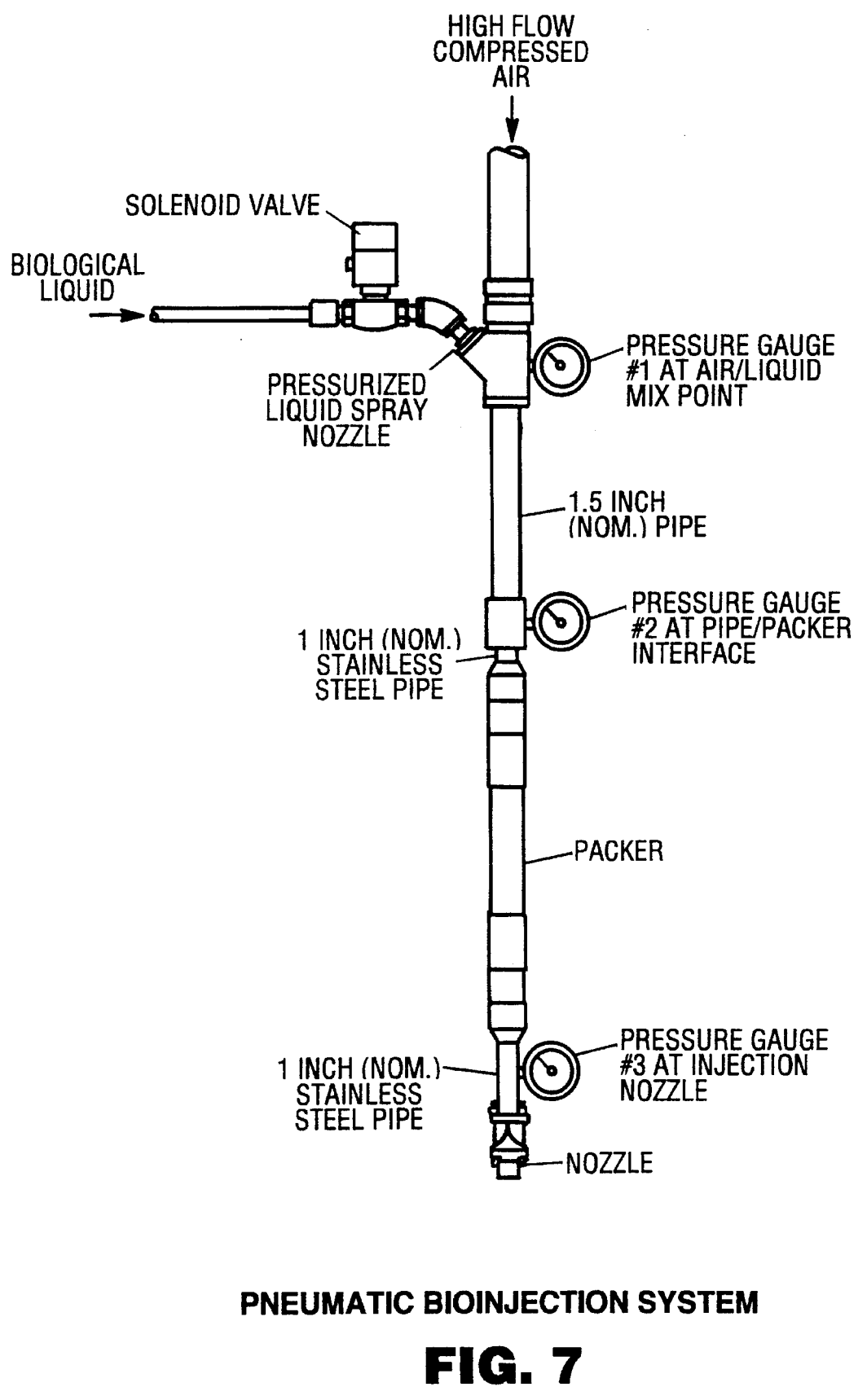

The second part of the study which was conducted involved combining the biopump with the pneumatic fracturing system. There were three major goals in this phase of the study. The first goal was to determine the efficiency of the pneumatic bioinjection system by measuring the percentage of the liquid leaving the injector in an atomized state. These tests were performed above ground which enabled direct visual observation of the atomization efficiency. Above ground testing was accomplished by erecting a scaffolding and suspending the packer system and injector vertically, as shown in FIG. 7. For the second objective, maximum pressure was measured at three points on the injection system in order to determine the liquid pressure that would be required during full scale injection. It is essential that the pressure of the injected liquid be higher than that of the injected air to assure a thorough dispersion. The location of the pressure gauges with respect to the pneumatic fracturing system is shown in FIG. 7. For the third objective, the flow rate was measured in order to obtain a predictable rate of liquid injection into the formation. These flowrates of liquid injection in the pneumatic fracturing system were compared to previously obtained flowrates of liquid injection into open air from the biopump tests in the first phase of the study. This comparison would determine whether the liquid flow would be constricted during a full scale pneumatic injection.

Two sets of experiments were performed using this system configuration. During the first run the system parameters were air injection pressure, air flow rate, and liquid pressure. A qualitative measurement of the efficiency of atomization was also recorded. Liquid flow rates could not be measured because the solenoid valve was not functioning properly. The second set of tests was performed with the solenoid valve operational. In these tests the liquid flowrates were measured, in addition to other parameters to check whether they were affected by back pressures from the pneumatic air stream.

As a result of all of the tests described above, the capabilities of the biopump were determined. It can attain a flow rate of 3.5 gallons per minute with the current spray nozzle. The optimum gas to liquid ratio for the pump with the current nozzle is 0.25, which means that in order to obtain an effluent liquid pressure of 200 psi, the initial air pressure must be set to one quarter of that pressure, i.e., 50 psi. Higher liquid flowrates are possible with the largest size nozzle, but a pressure drop should be expected. Thus, before using this nozzle some additional tests should be performed to obtain an gas to liquid pressure ratio for that nozzle.

The measurement of the efficiency of the liquid injection system was done by visual inspection. Contrary to initial fears, 100% of the liquid leaving the system was observed in an atomized state. This indicated that the pneumatic bioinjection system could very efficiently disperse a liquid into a formation during fracture. Pressure measurements collected at the three locations of the full scale bioinjection system are shown in Table 3 below. Since the system was open to the atmosphere and did not build up any back pressure, the measured values are much lower than the injection pressure. Pressure measured during an actual fracture injection below ground are slightly higher, although they remain substantially less than the injection pressure. During the final two runs with the full scale system the liquid flow rate was also measured. The results are also shown in Table 3 below. These flowrates correlate well with the biopump tests, which indicate that injecting the liquid into a high pressure, high flow air stream does not adversely affect the liquid flowrate. Thus, liquid can be added to the pneumatic fracturing air stream at the biopump's maximum flowrate.

TABLE 3

| | System Pressures for the Pneumatic Bioinjection Tests | | | | | |
|---|---|---|---|---|---|---|
| Trial No. | Injection Pressure (psi) | Gauge 1 (psi) | Gauge 2 (psi) | Gauge 3 (psi) | Liquid Flowrate (GPM) | Vol. Air to Liquid Ratio |
| 1 | 150 | 66 | 64 | 30 | No data | No data |
| 2 | 150 | 74 | 72 | 29 | No data | No data |
| 3 | 150 | 66 | 64 | 24 | No data | No data |
| 4 | 150 | 63 | 61 | 22 | No data | No data |
| 5 | 120 | 50 | 44 | 0 | No data | No data |
| 6 | 120 | 44 | 38 | 0 | 3.2 | 0.00050 |
| 7 | 120 | 38 | 32 | 0 | 3.2 | 0.00066 |

During the initial trials, neither the gas to liquid pressure ratio nor the liquid flowrate were satisfactory. The gas to liquid pressure ratio was not consistent enough to accurately predict liquid effluent pressures, while the effluent flowrates were too small. It was determined that the inlet air flow rate was not large enough for the pump to reach maximum efficient. To remedy the problem, the inlet air piping was enlarged. Following this adjustment, the gas to liquid pressure ratio became controllable, which allowed accurate prediction of effluent pressures. Liquid flowrates also increased following these adjustments, to a maximum of 3.5 gallons per minute.

A short series of tests was also performed using a larger size nozzle. During these tests a flowrate of 4.5 gallons per minute was achieved. The increased flow was accompanied by a larger pressure drop, however, as indicated by the sudden change of gas to liquid pressure ratios. This indicates that the pump must be set to a higher initial inlet pressure in order to maintain the desired effluent pressure.

What is claimed is:

1. A method for reducing or eliminating non-naturally occurring subsurface, liquid contaminants from one or more soil formations, comprising:

a) pneumatically fracturing the soil formation, comprising:
   i) inserting a tubular probe partially into the soil formation such that at least one orifice of a nozzle fluidly connected with the tubular probe is positioned at a predetermined height; and
   ii) supplying a pressurized gas into the tubular probe such that the pressurized gas travels through the at least one orifice into the soil to produce a fracture network in said soil formation; and simultaneously with creation of said fracture network, or subsequently thereafter:

b) inserting into said fracture network and thereby throughout adjacent portions of said soil formation, a pressurized gas stream, and introducing into said pressurized gas stream a mixture of one or more liquid amendments, and optionally water, wherein said pressurized gas, in conjunction with said liquid amendments and optionally water, has an oxygen or other electron acceptor content sufficient to promote the growth of aerobic or other microorganisms in said fracture network, and wherein said pressurized gas has a sufficiently high gas to liquid ratio to atomize said liquid amendments, whereby said amendments and optionally water are distributed throughout said fracture network and adjacent portions of said soil formation; and c) as necessary, repeating steps a) and b) on a sequential basis in order to treat additional portions of the soil formation(s), and on a periodic basis in order to replenish said liquid amendments and optionally oxygen or other electron acceptor to said fracture network and adjacent portions of said soil formation(s).

2. A method according to claim 1 wherein the gas is compressed air, which at the high gas to liquid ratio provides substantial amounts of oxygen to the fracture network and adjacent soil formation; the liquid amendments are one or more members selected from the group consisting of nutrients for growth of aerobic bacteria, buffering compounds, and inoculum comprising aerobic microorganisms which are able to degrade said contaminants; the survivability of the microorganisms contained in the liquid amendments and water is protected and the growth rate thereof is enhanced and the blend of liquid amendments and their component concentrations are controlled by an automated system, whereby the treatment of any given soil formation can be tailored to the specific requirements of said formation.

3. A method according to claim 1 wherein the soil contains substantial amounts of silt or clay, or is a tight bedrock formation, and wherein the contaminants are one or more of benzene, toluene or xylene.

4. A method for reducing or eliminating non-naturally occurring, subsurface, liquid contaminants from one or more soil formations by establishing an in situ bioremediation cell therein to degrade said contaminants, comprising:

a) pneumatically fracturing the soil formation, comprising:
  i) inserting a tubular probe partially into the soil formation such that at least one orifice of a nozzle fluidly connected with the tubular probe is positioned at a predetermined height; and
  ii) supplying a pressurized gas into the tubular probe such that the pressurized gas travels through the at least one orifice into the soil to produce a fracture network in said soil formation; and simultaneously with creation of said fracture network, or subsequently thereafter:

b) inserting into said fracture network and thereby throughout adjacent portions of said soil formation, a pressurized gas stream, and introducing a mixture of one or more liquid amendments, and optionally water, into said pressurized gas stream, wherein said pressurized gas, in conjunction with said liquid amendments and optionally water, has an oxygen or other electron acceptor content sufficient to promote the growth of aerobic or other microorganisms in said fracture network, and wherein said pressurized gas has a sufficiently high gas to liquid ratio to atomize said liquid amendments and optionally water, whereby said amendments and optionally water are distributed throughout said fracture network and adjacent portions of said soil formation;

c) as necessary, repeating steps a) and b) on a sequential basis in order to treat additional portions of the soil formation(s), and on a periodic basis in order to replenish said liquid amendments and oxygen or other electron acceptor to said fracture network and adjacent portions of said soil formation(s); and d) maintaining a low volume flow of a pressurized gas throughout said fracture network and adjacent portions of said soil formation(s) by means of reduced pressure exerted thereon, wherein said pressurized gas has an oxygen content sufficient to promote the growth of aerobic microorganisms, for a time sufficient to establish an in situ bioremediation cell in said soil formation(s) and degrade said contaminants therein.

5. A method according to claim 4 wherein the pressurized gas is compressed air; wherein the reduced pressure exerted on said fracture network and adjacent portions of said soil formation(s) is created by one or more extraction wells having vacuum pumps attached thereto; and wherein one or more vent wells are optionally created to supply additional amounts of air to said soil formation(s).

6. A method according to claim 4 wherein the soil contains substantial amounts of silt or clay, or is a tight bedrock formation, and wherein the contaminants are one or more of benzene, toluene or xylene.

7. A method for synergistically reducing or eliminating the non-naturally occurring, subsurface, liquid contaminants from one or more soil formations having low initial permeability, comprising:

a) pneumatically fracturing the soil formation, comprising:
  i) inserting a tubular probe partially into the soil such that at least one orifice of a nozzle fluidly connected with the tubular probe is positioned at a predetermined height; and
  ii) supplying a pressurized gas into the tubular probe such that the pressurized gas travels through the at least one orifice into the soil to produce a fracture network in said soil formation; and simultaneously with creation of said fracture network, or subsequently thereafter:

b) inserting into said fracture network and thereby throughout adjacent portions of said soil formation, a pressurized gas stream, and introducing a mixture of one or more liquid amendments, selected from the group consisting of nutrients for growth of aerobic or other microorganisms, buffering compounds, and inoculum comprising aerobic or other microorganisms which are able to degrade said contaminants, and optionally water, into said pressurized gas stream, wherein said pressurized gas, in conjunction with said liquid amendments and optionally water, has an oxygen or other electron acceptor content sufficient to promote the growth of aerobic or other microorganisms in said fracture network and adjacent portions of said soil formation, and wherein said pressurized gas has a sufficiently high gas to liquid ratio to atomize said liquid amendments and optionally water, whereby said amendments are distributed throughout said fracture network and adjacent portions of said soil formation;

c) as necessary, repeating steps a) and b) on a sequential basis in order to treat additional portions of the soil formation(s), and on a periodic basis in order to replenish said liquid amendments and oxygen or other electron acceptor to said fracture network and adjacent portions of said soil formation(s); and d) maintaining a low volume flow of a pressurized gas throughout said fracture network and adjacent portions of said soil formations) by means of reduced pressure exerted thereon, wherein said pressurized gas has an oxygen content sufficient to promote the growth of aerobic microorganisms, for a time sufficient to synergistically eliminate or reduce said contaminants from said soil formation(s).

8. A method according to claim 7 wherein the pressurized gas is compressed air; wherein the reduced pressure exerted on said fracture network and adjacent portions of said soil formation(s) is created by one or more extraction wells having vacuum pumps attached thereto; and wherein one or more vent wells are created to supply additional amounts of air to said soil formation(s).

9. A method according to claim 7 wherein the soil contains substantial amounts of silt or clay, or is a tight bedrock formation, and wherein the contaminants are one or more of benzene, toluene or xylene.

10. A method according to claim 7 wherein the blend of liquid amendments and their component concentrations are controlled by an automated system, whereby the treatment of any given soil formation can be tailored to the specific requirements of said formation.

11. A method for creating a gradient of aerobic, denitrifying, and methanogenic degradation sequences in a soil formation which increases overall biodegradation efficiency, and thus provides an improved method for the bioremediation of non-naturally occurring, subsurface, liquid contaminants from one or more soil formations, comprising:

a) pneumatically fracturing the soil formation, comprising:
  i) inserting a tubular probe partially into the soil such that at least one orifice of a nozzle fluidly connected with the tubular probe is positioned at a predetermined height; and
  ii) supplying a pressurized gas into the tubular probe such that the pressurized gas travels through the at least one orifice into the soil to produce a fracture network in said soil formation; and simultaneously with creation of said fracture network, or subsequently thereafter:

b) inserting into said fracture network and thereby throughout adjacent portions of said soil formation, a pressurized gas stream, and introducing a mixture of one or more liquid amendments, selected from the group consisting of nutrients for growth of aerobic and other microorganisms, buffering compounds, and inoculum comprising aerobic and other microorganisms which are able to degrade said contaminants, and optionally water, into said pressurized gas stream, wherein said pressurized gas, in conjunction with said liquid amendments and optionally water, has an oxygen or other electron acceptor content sufficient to promote the growth of aerobic or other microorganisms in said fracture network and adjacent portions of said soil formation, and wherein said pressurized gas stream has a sufficiently high gas to liquid ratio to atomize said liquid amendments, whereby said amendments are distributed throughout said fracture network and adjacent soil formation;

c) as necessary, repeating steps a) and b) on a sequential basis in order to treat additional portions of the soil formation(s), and on a periodic basis in order to replenish said liquid amendments and oxygen or other electron acceptor to said fracture network and adjacent portions of said soil formation(s); and d) maintaining a low volume flow of a pressurized gas throughout said fracture network and adjacent portions of said soil formation(s) by means of reduced pressure exerted thereon, wherein said pressurized gas has an oxygen content sufficient to promote the growth of aerobic microorganisms, whereby the gradient of microbial degradation is promoted, increasing the overall efficiency thereof.

12. A method according to claim 11 wherein said soil contains substantial amounts of silt or clay, or is a tight bedrock formation, and wherein said contaminants are one or more of benzene, toluene or xylene.

13. An apparatus for reducing or eliminating non-naturally occurring, subsurface, liquid contaminants from one or more soil formations, comprising:

1) fracturing means for pneumatically fracturing said soil formation, comprising:
  a) tubular probe means for receiving
    i) a pressurized gas, said probe means further comprising:
    ii) a soil penetrating portion adapted to be inserted in a well in said soil formation, and
    iii) an above soil portion in fluid communication with said soil penetrating portion, said soil penetrating portion including tube means for receiving said pressurized gas;
  b) first and second packer means connected with said tube means for pressing against walls of said well so as to provide a sealed area in said well between said first and second packer means; and
  c) nozzle means positioned in said sealed area in fluid communication with said tube means for supplying said pressurized gas to said soil formation, said nozzle means including at least one orifice therein which fluidly connects said soil formation with said tubular probe means; and
  d) pressurized gas supply means for supplying said pressurized gas to said above soil portion of said tubular probe means, wherein said pressurized gas travels through the at least one orifice into said soil to produce a fracture network; and
simultaneously with creation of the fracture network; or subsequently thereafter, 2) means for introducing one or more liquid amendments, and optionally water, into said pressurized gas stream, wherein said pressurized gas, in conjunction with said liquid amendments, and optionally water, has an oxygen or other electron acceptor content sufficient to promote the growth of aerobic microorganisms in said fracture network, and wherein said pressurized gas has a sufficiently high gas to liquid ratio to atomize said liquid amendments, whereby said amendments are distributed throughout said fracture network; comprising:
  a) separate supply means for independently supplying said one or more liquid amendments, including valve means associated with each supply means which control the flow and amount of liquid amendment from each supply means;
  b) mixing means in liquid communication with each and all of the liquid amendment supply means, and with a supply of water having a valve means, whereby water is optionally mixed with said one or more liquid amendments;
  c) pump means for introducing the contents of said mixing means under pressure into said above soil portion of said tubular probe means, coincidently with passage therethrough of said pressurized gas;
  d) nozzle means at the point of communication between the contents of said mixing means under pressure, and said above soil portion of said tubular probe means; and e) pressure regulating valve means between said pump means and said above soil portion of said tubular probe means to regulate and provide a sufficiently high gas to liquid ratio to atomize said liquid amendments and optionally water, whereby said amendments and optionally water are distributed throughout said fracture network.

14. An apparatus according to claim 13 wherein said orifice has a substantially oval configuration and there are cone means positioned within said nozzle means for directing said pressurized gas through said orifice with substantially no pressure drop; and wherein said pressurized gas supply means comprises: 1) compressor means for producing said pressurized gas; 2) one or more holding tanks means for holding a supply of said pressurized gas; and 3) valve means for connecting said holding means with said tubular supply means in order to provide a rush of said pressurized gas to said tubular probe means.

15. An apparatus according to claim 13 additionally comprising adjustment means for permitting relative movement between said first and second packer means in response to soil movement during a soil formation fracturing operation; wherein said adjustment means comprises means for slidably connecting said first and second packer means; and wherein said means for slidably connecting comprises a different diameter tube on which said second packer means is mounted, said different diameter tube being slidable with respect to said tube means, sealing means for sealing said tube means with said different diameter tube, a rod connected to said tube means and extending through said tube means and out of said different diameter tube, and spring means engaged between said rod and said different diameter tube for biasing said second packer means toward said first packer means while permitting relative movement therebetween.

16. An apparatus with separate, multiple parts which collectively form a system for reducing or eliminating non-naturally occurring, subsurface, liquid contaminants from one or more soil formations by establishing an in situ bioremediation cell therein to degrade said contaminants, comprising:
   1) fracturing means for pneumatically fracturing the soil formation, comprising:
      a) a tubular probe means for receiving:
         i) a pressurized gas, said probe means further comprising:
         ii) a soil penetrating portion adapted to be inserted in a well in said soil formation, and
         iii) an above soil portion in fluid communication with said soil penetrating portion, said soil penetration portion including tube means for receiving said pressurized gas;
      b) first and second packer means connected with said tube means for pressing against walls of said well so as to provide a sealed area in said well between said first and second packer means; and
      c) nozzle means positioned in said sealed area in fluid communication with said tube means for supplying said pressurized gas to said soil formation, said nozzle means including at least one orifice therein which fluidly connects said soil formation with said tubular probe means; and
      d) pressurized gas supply means for supplying said pressurized gas to said above soil portion of said tubular probe means, wherein said pressurized gas travels through said at least one orifice into said soil to produce a fracture network, and wherein said pressurized gas, in conjunction with said water and liquid amendments, has an oxygen or other electron acceptor content sufficient to promote said growth of aerobic and other microorganisms in said fracture network;
   simultaneously with creation of said fracture network or subsequently thereafter,
   2) means for introducing one or more liquid amendments, and optionally water, into a pressurized gas stream having a sufficiently high gas to liquid ratio to atomize said liquid amendments and optionally water, whereby said amendments and optionally water are distributed throughout said fracture network; comprising:
      a) separate supply means for independently supplying said one or more liquid amendments, including valve means associated with each supply means which control the flow and amount of liquid amendment from each supply means;
      b) mixing means in liquid communication with each and all of said liquid amendment supply means, and with a supply of water having a valve means, whereby water is optionally mixed with said one or more liquid amendments;
      c) pump means for introducing said contents of said mixing means under pressure into said above soil portion of said tubular probe means, coincidently with passage therethrough of said pressurized gas;
      d) nozzle means at the point of communication between said contents of said mixing means under pressure, and said above soil portion of said tubular probe means;
      e) pressure regulating valve means between said pump means and said above soil portion of said tubular probe means to regulate and provide a sufficiently high gas to liquid ratio to atomize said liquid amendments and optionally water, whereby said amendments and optionally water are distributed throughout said fracture network;
   3) means for exerting reduced pressure on said fracture network and adjacent soil formation in order to maintain a low volume flow of a pressurized gas through said fracture network, wherein said pressurized gas has an oxygen content sufficient to promote the growth of aerobic microorganisms;
   4) means for supplying said pressurized gas at a low volume flow; and optionally
   5) means for passively supplying air to said soil formation.

17. An apparatus system according to claim 16 wherein said means for exerting reduced pressure on the fracture network is a vacuum pump connected to one or more extraction wells; and said optional means for supplying air comprise outlying wells which are vented to the atmosphere in order to provide passive air inlets to the fracture network and adjacent soil formation.

* * * * *